United States Patent
Yang et al.

(10) Patent No.: US 10,812,226 B2
(45) Date of Patent: Oct. 20, 2020

(54) SIGNAL TRANSMISSION AND RECEPTION METHOD AND DEVICE FOR SAME

(71) Applicant: LG ELECTRONICS INC., Seoul (KR)

(72) Inventors: Suckchel Yang, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 309 days.

(21) Appl. No.: 15/781,607

(22) PCT Filed: Dec. 9, 2016

(86) PCT No.: PCT/KR2016/014434
§ 371 (c)(1),
(2) Date: Jun. 5, 2018

(87) PCT Pub. No.: WO2017/099515
PCT Pub. Date: Jun. 15, 2017

(65) Prior Publication Data
US 2020/0266934 A1    Aug. 20, 2020

Related U.S. Application Data

(60) Provisional application No. 62/264,883, filed on Dec. 9, 2015.

(51) Int. Cl.
*H04L 1/18* (2006.01)
*H04L 5/14* (2006.01)
*H04L 5/00* (2006.01)

(52) U.S. Cl.
CPC .......... *H04L 1/1819* (2013.01); *H04L 5/0055* (2013.01); *H04L 5/0082* (2013.01); *H04L 5/1469* (2013.01)

(58) Field of Classification Search
CPC ... H04L 1/1819; H04L 5/0055; H04L 5/1469; H04L 5/0082
See application file for complete search history.

(56) References Cited

U.S. PATENT DOCUMENTS

| | | | |
|---|---|---|---|
| 2014/0071954 A1 | 3/2014 | Au et al. | |
| 2014/0078941 A1 | 3/2014 | Seo et al. | |
| 2017/0111923 A1* | 4/2017 | Nogami | H04W 72/1263 |

FOREIGN PATENT DOCUMENTS

EP    2690806    1/2014

OTHER PUBLICATIONS

Samsung: "Study on specification impact for uplink due to TTI shortening", vol. RAN WG1, No. Anaheim, USA; Nov. 15, 2015 (Nov. 15, 2015), R1-156819.*

(Continued)

*Primary Examiner* — Jackie Zuniga Abad
(74) *Attorney, Agent, or Firm* — Lee Hong Degerman Kang Waimey

(57) ABSTRACT

The present invention relates to a wireless communication system. More particularly, the present invention relates to a method and a device for same, the method comprising the steps of: receiving information including a UL-DL configuration; transmitting or receiving HARQ-ACK information in a short-TTI of SF # n with respect to data received or transmitted in short-TTIs of SFs # n−a; and receiving or retransmitting the data in a short-TTI of SF # n+b, wherein a+b is equal to the number of SFs corresponding to a minimum DL-to-UL switching period.

6 Claims, 15 Drawing Sheets

(56) References Cited

OTHER PUBLICATIONS

PCT International Application No. PCT/KR2016/014434, Written Opinion of the International Searching Authority dated Apr. 3, 2017, 15 pages.
Samsung, "Study on specification impact for downlink due to TTI shortening", 3GPP TSG RAN WG1 Meeting #83, R1-156819, Nov. 2015, 6 pages.
Catt, "System Analysis on TTI Shortening", 3GPP TSG RAN WG1 Meeting #83, R1-156613, Nov. 2015, 9 pages.
Intel, "Discussion on TTI Shortening," 3GPP TSG RAN WG1 Meeting #83, R1-156540, Nov. 2015, 5 pages.
European Patent Office Application Serial No. 16873380.6, Search Report dated Jul. 12, 2019, 10 pages.
Ericsson, "Physical layer aspects of TTI shortening for downlink transmissions", 3GPP TSG RAN WG1 Meeting #83, R1-157148, XP051040023, Nov. 2015, 5 pages.

\* cited by examiner

PDSCH-ACK/NACK timing (UL-DL configuration #1)

PHICH/UL grant-PUSCH timing (UL-DL configuration #1)

HARQ processes in UL-DL configuration #1

SIGNAL TRANSMISSION AND RECEPTION METHOD AND DEVICE FOR SAME

CROSS-REFERENCE TO RELATED APPLICATIONS

This application is the National Stage filing under 35 U.S.C. 371 of International Application No. PCT/KR2016/014434, filed on Dec. 9, 2016, which claims the benefit of U.S. Provisional Application No. 62/264,883, filed on Dec. 9, 2015, the contents of which are all hereby incorporated by reference herein in their entirety.

TECHNICAL FIELD

The present invention relates to a wireless communication system and, more specifically, to a method for transmitting and receiving signals in a system supporting time division duplex (TDD) and an apparatus therefor.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

DISCLOSURE OF THE INVENTION

Technical Task

One technical task of the present invention is to provide a method of efficiently transceiving signals in a wireless communication system and apparatus therefor. Another technical task of the present invention is to provide a method of efficiently transceiving signals in a TDD system and apparatus therefor. Further technical task of the present invention is to provide a method of efficiently operating an HARQ process in a TDD system and apparatus therefor.

The technical problems solved by the present invention are not limited to the above technical problems and those skilled in the art may understand other technical problems from the following description.

Technical Solutions

In one technical aspect of the present invention, provided herein is a method of performing a Hybrid Automatic Repeat request (HARQ) procedure by a communication device in a wireless communication system, including receiving information indicating uplink-downlink (UL-DL) configuration, wherein a subframe (SF) pattern according to the UL-DL configuration is represented as Table 1, and DL-SF and UL SF configured with a plurality of short-Transmission Time Intervals (TTIs), transmitting/receiving HARQ-acknowledgement (ACK) information in a short-TTI of SF # n for data received/transmitted in a short-TTI of SF # n−a, and re-receiving/retransmitting the data in a short-TTI of SF # n+b, and wherein a+b is equal to the SF number corresponding to a minimum DL-to-UL switching period,

TABLE 1

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D, | where D, S and U indicate DL SF, special (S) SF and UL SF, respectively.

In another technical aspect of the present invention, provided herein is a communication device configured to perform a Hybrid Automatic Repeat request (HARQ) procedure in a wireless communication system, including a radio frequency (RF) unit and a processor configured to receive information indicating uplink-downlink (UL-DL) configuration, wherein a subframe (SF) pattern according to the UL-DL configuration is represented as Table 1, and DL-SF and UL SF are configured with a plurality of short-Transmission Time Intervals (TTIs), wherein the processor is further configured to transmit/receive HARQ-acknowledgement (ACK) information information in a short-TTI of SF # n for data received/transmitted in a short-TTI of SF # n−a and re-receive/retransmit the data in a short-TTI of SF # n+b, and wherein a+b is equal to the SF number corresponding to a minimum DL-to-UL switching period,

TABLE 1

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D, | where D, S and U indicate DL SF, special (S) SF and UL SF, respectively.

Preferably, a+b may be equal to a minimum SF period of S SF.

Preferably, the UL-DL configuration may include UL-DL configuration #1 or UL-DL configuration #2 and a+b may be 5.

Preferably, the S SF may include at least one UL short-TTI, HARQ-ACK information may be transmitted in the UL short-TTI of S SF # m for data received in a short-TTI of SF # m−c, and the data may be re-received in a short-TTI of SF # m+d. If SF # m−a is DL SF, c may have a value equal to a. If the SF # m−a is UL SF, the SF # m−c may be a DL SF having a biggest interval with the S SF # m among at least one DL SF of which interval with S SF # m is smaller than a SFs. And, c+d is equal to a+b.

Preferably, the S SF may include at least one DL short-TTI. HARQ-ACK information may be received in the DL short-TTI of S SF # m for data transmitted in a short-TTI of SF # m−c. The data may be retransmitted in a short-TTI of SF # m+d. If SF # m+b is UL SF, d may have a value equal to b. If the SF # m+b is DL SF, the SF # m+d may be a UL SF having a biggest interval with the S SF # m among at least one UL SF of which interval with S SF # m is smaller than b SFs. And, c+d may be equal to a+b.

ADVANTAGEOUS EFFECTS

According to the present invention, signals can be efficiently transceived in a wireless communication system. And, signals can be efficiently transceived in a TDD system. Moreover, an HARQ process can be efficiently operated in a TDD system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention, illustrate embodiments of the invention and together with the description serve to explain the principle of the invention. In the drawings.

BEST MODE FOR INVENTION

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, Evolved UTRA (E-UTRA). UTRA is a part of Universal Mobile Telecommunications System (UMTS). $3^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is an evolution of 3GPP LTE.

While the following description is given, centering on 3GPP LTE/LTE-A for clarity, this is purely exemplary and thus should not be construed as limiting the present invention. It should be noted that specific terms disclosed in the present invention are proposed for convenience of description and better understanding of the present invention, and the use of these specific terms may be changed to other formats within the technical scope or spirit of the present invention.

Figure 1:
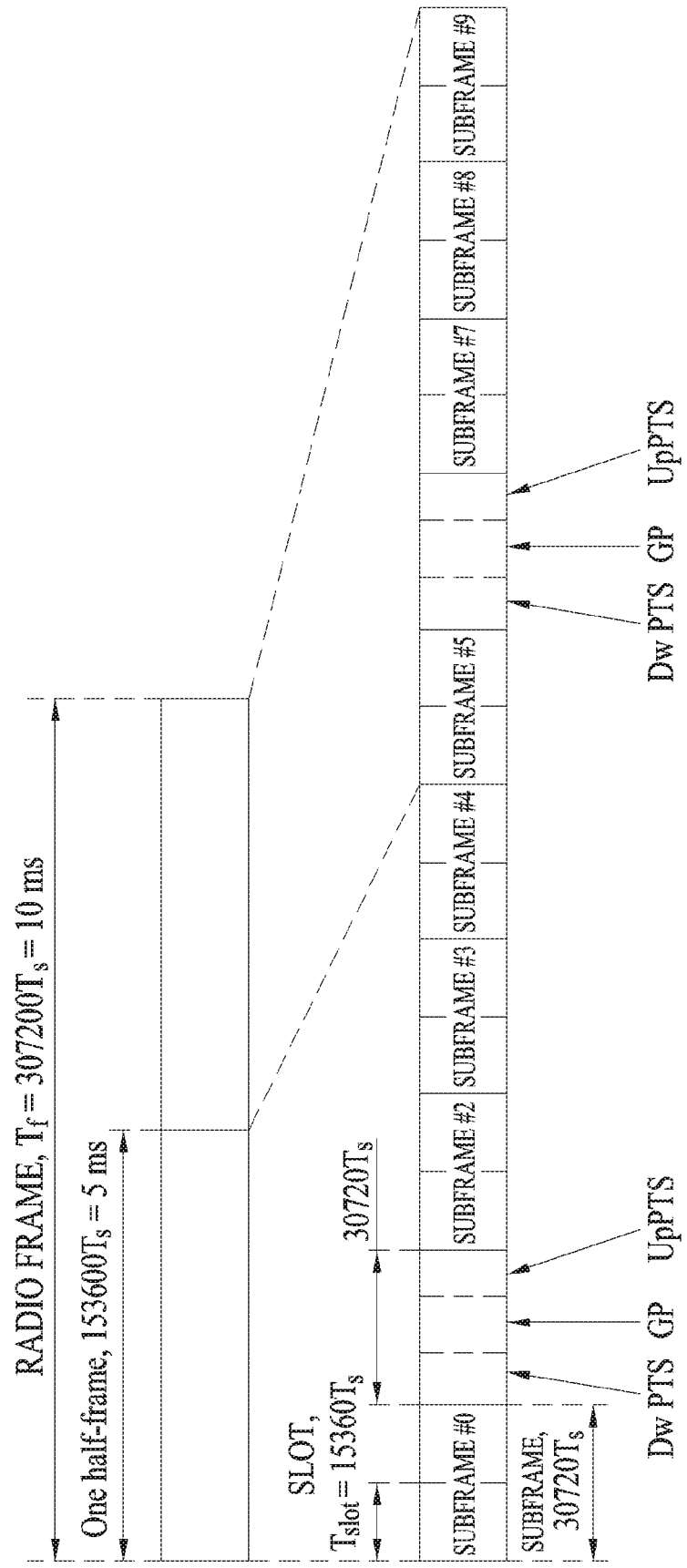
FIG. 1 illustrates a radio frame structure.

FIG. 1 exemplarily shows a radio frame structure.

Referring to FIG. 1, a radio frame used in 3GPP LTE/LTE-A has a length of 10 ms (307200 Ts) and is configured with 10 subframes in equal size. Each of the 10 subframes in the radio frame can be numbered. Here, Ts indicates a sampling time and expressed as Ts=1/(2048*15 kHz). Each subframe has a length of 1 ms and is configured with 2 slots. 20 slots in the radio frame can be sequentially numbered from 0 to 19. Each slot has a length of 0.5 ms. A time for transmitting a subframe is defined as a transmission time interval (TTI). A time resource can be identified by a radio frame number (or, called a radio fame index), a subframe number (or, called a subframe index), a slot number (or, called a slot index), etc.

A radio frame may be configured differently according to a duplex mode. Since DL (downlink) transmission and UL (uplink) transmission in FDD (frequency division duplex) mode are sorted by frequency, a radio frame includes one of a DL subframe and a UL subframe on a specific frequency band. Since DL (downlink) transmission and UL (uplink) transmission in TDD (time division duplex) mode are sorted by time, a radio frame includes both a DL subframe and a UL subframe with respect to a specific frequency band.

Particularly, FIG. 1 shows a TDD radio frame structure used by 3GPP LTE(-A). Table 1 exemplarily shows UL-DL (uplink-downlink) configuration (UD-cfg) of subframes within a radio frame in TDD mode.

TABLE 1

| Uplink-downlink config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes a DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows a special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cycliprefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $22040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 2:
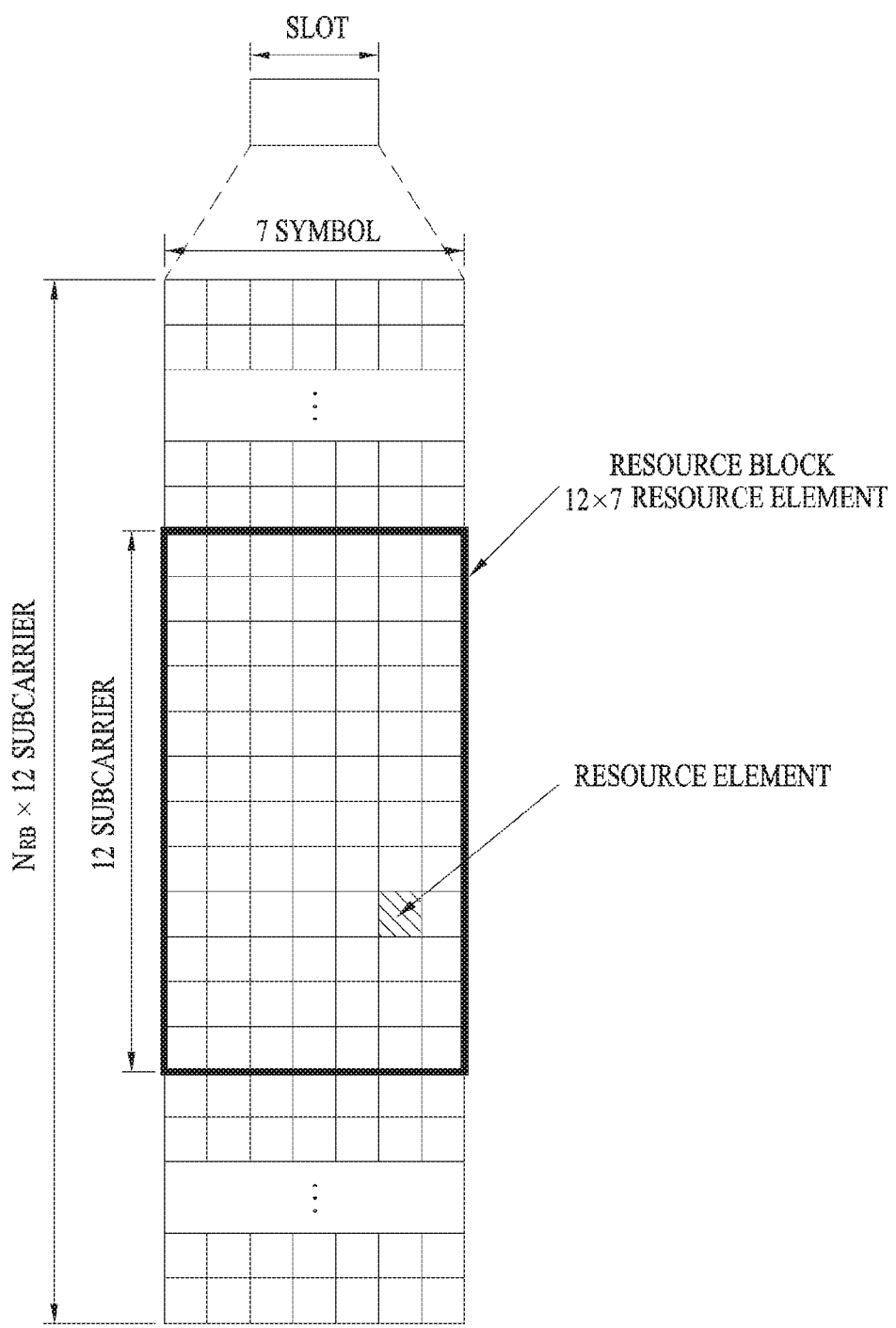
FIG. 2 illustrates a resource grid of a downlink slot.

FIG. 2 illustrates a resource grid of a downlink slot.

Referring to FIG. 2, a downlink slot includes a plurality of OFDM symbols in the time domain. One downlink slot may include 7(6) OFDM symbols, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of an uplink slot may be same as that of the downlink slot except that OFDM symbols by replaced by SC-FDMA symbols.

Figure 3:
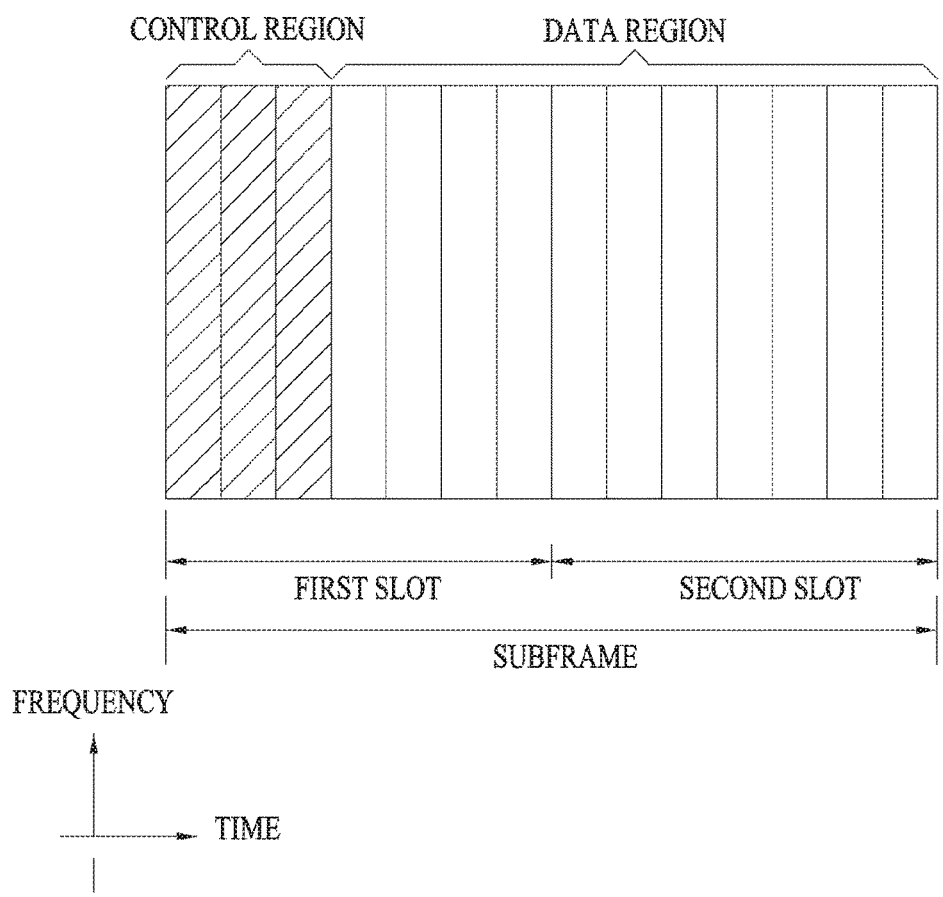
FIG. 3 illustrates a downlink subframe structure.

FIG. 3 illustrates a downlink subframe structure.

Referring to FIG. 3, a maximum of 3 (4) OFDM symbols located in a front portion of a first slot within a subframe correspond to a control region to which a control channel is allocated. The remaining OFM symbols correspond to a data region to which a physical downlink shared chancel (PDSCH) is allocated. A PDSCH is used to carry a transport block (TB) or a codeword (CW) corresponding to the TB. The TB means a data block transmitted from a MAC layer to a PHY layer through a transport channel. The codeword corresponds to a coded version of a TB. The corresponding relationship between the TB and the CW depends on swiping. In the specifically, the PDSCH, TB and CW are interchangeably used. Examples of downlink control channels used in LTE(-A) include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal. A HARQ-ACK response includes positive ACK (simply, ACK), negative ACK (NACK), DTX (Discontinuous Transmission) or NACK/DTX. Here, HARQ-ACK is used with HARQ ACK/NACK and ACK/NACK interchangeably.

Control information transmitted through the PDCCH is referred to as downlink control information (DCI). The DCI includes resource allocation information for a UE or a UE group and other control information. For example, the DCI includes uplink/downlink scheduling information, an uplink transmit (Tx) power control command, etc. Transmission modes and information content of DCI formats for configuring a multi-antenna technology are as follows.

Transmission Mode (TM)
  Transmission mode 1: Transmission from a single base station antenna port
  Transmission mode 2: Transmit diversity
  Transmission mode 3: Open-loop spatial multiplexing
  Transmission mode 4: Closed-loop spatial multiplexing
  Transmission mode 5: Multi-user MIMO(Multiple Input Multiple Output)
  Transmission mode 6: Closed-loop rank-1 precoding
  Transmission mode 7: Transmission using UE-specific reference signals DCI Format
  Format 0: Resource grants for the PUSCH(Physical Uplink Shared Channel) transmissions (uplink)
  Format 1: Resource assignments for single codeword PDSCH(Physical Downlink Shared Channel) transmissions (transmission modes 1, 2 and 7)
  Format 1A: Compact signaling of resource assignments for single codeword PDSCH (all modes)
  Format 1B: Compact resource assignments for PDSCH using rank-1 closed loop precoding (mode 6)
  Format 1C: Very compact resource assignments for PDSCH (e.g. paging/broadcast system information)
  Format 1D: Compact resource assignments for PDSCH using multi-user MIMO (mode 5)
  Format 2: Resource assignments for PDSCH for closed-loop MIMO operation (mode 4)
  Format 2A: Resource assignments for PDSCH for open-loop MIMO operation (mode 3)
  Format 3/3A: Power control commands for PUCCH (Physical Uplink Control Channel) and PUSCH with 2-bit/1-bit power adjustments As described above, the PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Figure 4:
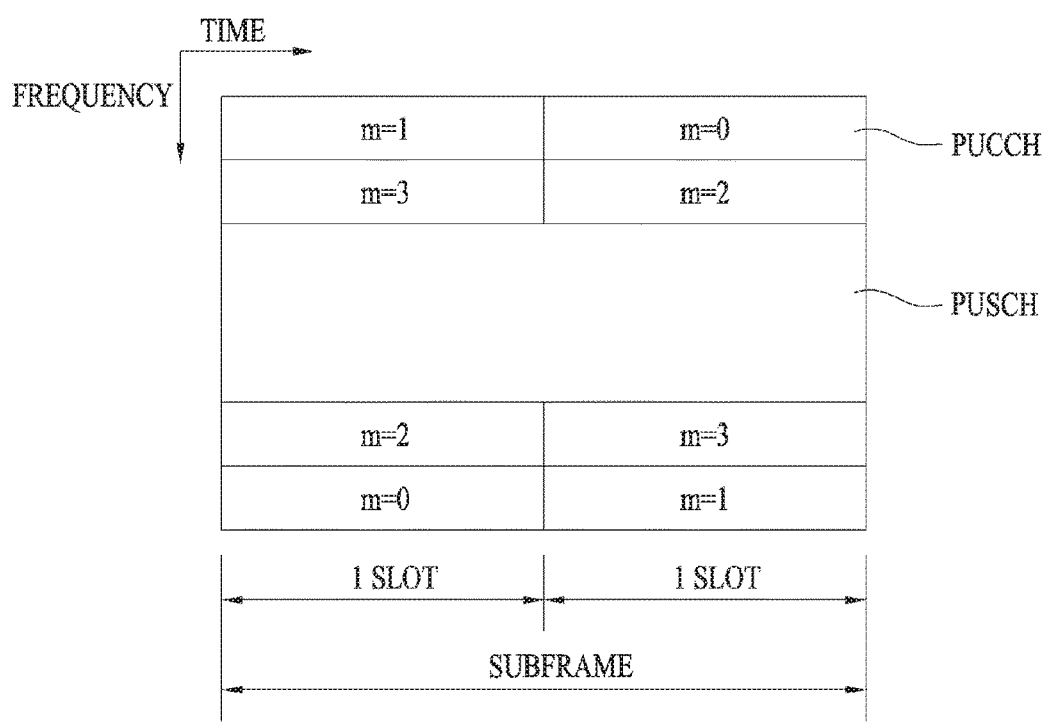
FIG. 4 illustrates an uplink subframe structure.

FIG. 4 illustrates an uplink subframe structure for use in LTE(-A).

Referring to FIG. 4, an uplink subframe includes a plurality of (e.g. 2) slots. A slot may include different numbers of SC-FDMA symbols according to CP lengths. The uplink subframe is divided into a control region and a data region in the frequency domain. The data region is allocated with a PUSCH and used to carry a data signal such as audio data. The control region is allocated a PUCCH and used to carry uplink control information (UCI). The PUCCH includes an RB pair located at both ends of the data region in the frequency domain and hopped in a slot boundary.

The PUCCH can be used to transmit the following control information.

Scheduling Request (SR): This is information used to request a UL-SCH resource and is transmitted using On-Off Keying (OOK) scheme.

HARQ-ACK: This is a response to a downlink data packet (e.g. codeword) on a PDSCH and indicates whether the downlink data packet has been successfully received. A 1-bit HARQ-ACK signal is transmitted as a response to a single downlink codeword and a 2-bit HARQ-ACK signal is transmitted as a response to two downlink codewords. A HARQ-ACK response includes positive ACK (simply, ACK), negative ACK (NACK), DTX (Discontinuous Transmission) or NACK/DTX. Here, the term HARQ-ACK is used interchangeably with the term HARQ ACK/NACK and ACK/NACK.

Channel State Information (CSI): This is feedback information about a downlink channel. MIMO (Multiple Input Multiple Output)-related feedback information includes a rank indicator (RI) and a precoding matrix indicator (PMI). 20 bits per subframe are used.

The quantity of control information (UCI) that a UE can transmit through a subframe depends on the number of SC-1-DMA symbols available for control information transmission. The SC-1-DMA symbols available for control information transmission correspond to SC-FDMA symbols other than SC-FDMA symbols of the subframe, which are used for reference signal transmission. In the case of a subframe in which a Sounding Reference Signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 3 shows the mapping relationship between PUCCH formats and UCI in LTE(-A).

TABLE 3

| PUCCH format | UCI (Uplink Control Information) |
| --- | --- |
| Format 1 | SR (Scheduling Request) (non-modulated waveform) |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 (LTE-A) | Up to 24-bit HARQ ACK/NACK + SR |

A description will be given of TDD signal transmission timing in a single carrier (or cell) situation with reference to FIGS. 5 to 11.

Figure 5:
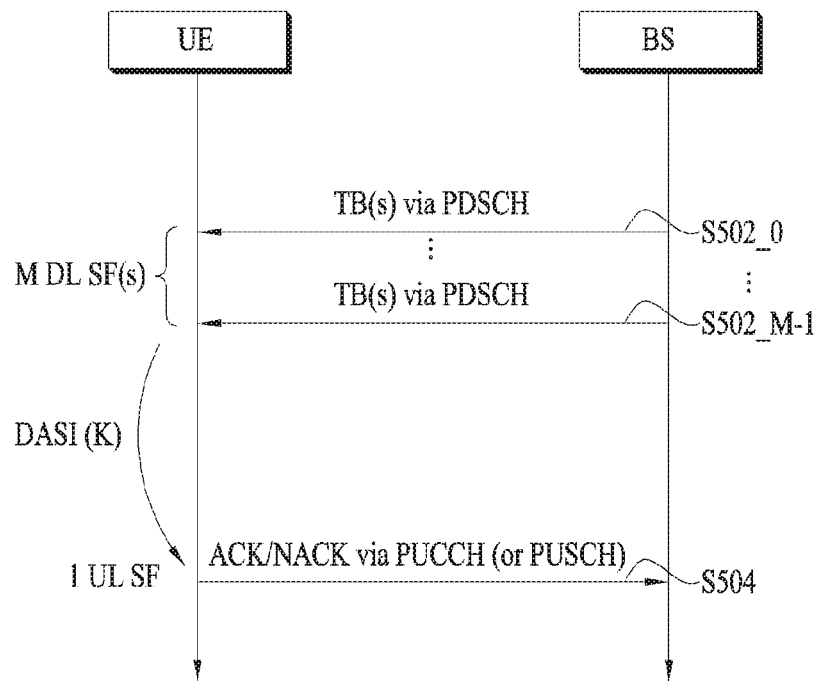
FIGS. 5 and 6 illustrate TDD UL ACK/NACK (Uplink Acknowledgement/Negative Acknowledgement) transmission timing in a single cell situation.
Figure 6:
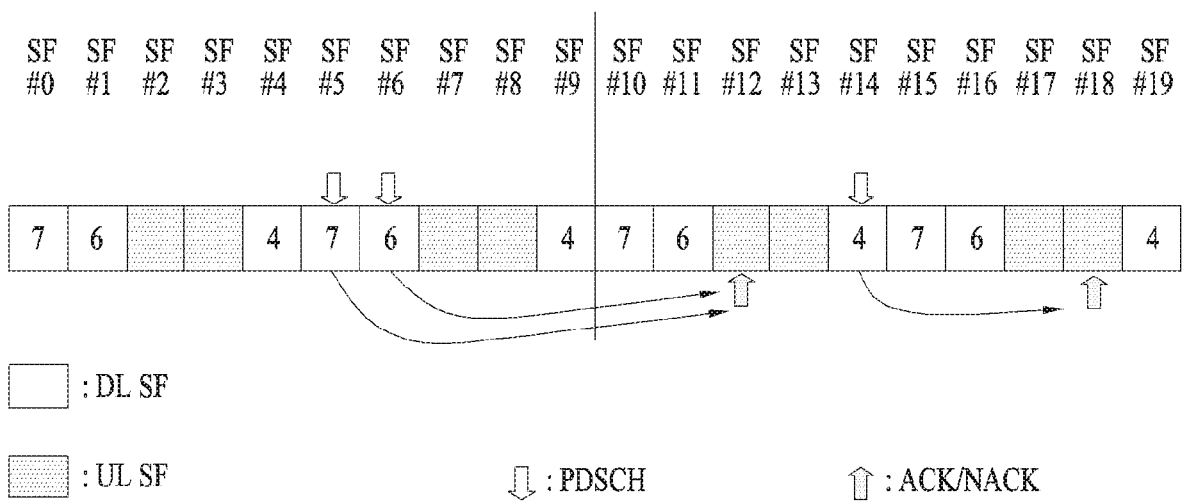

FIGS. 5 and 6 illustrate PDSCH-UL ACK/NACK timing. Here, UL ACK/NACK means ACK/NACK transmitted on uplink, as a response to DL data (e.g. PDSCH).

Referring to FIG. 5, a UE can receive one or more PDSCH signals in M DL subframes (SFs) (S502_0 to S502_M-1). Each PDSCH signal is used to transmit one or more (e.g. 2) transport blocks (TBs) according to transmission mode. A PDCCH signal indicating SPS (Semi-Persistent Scheduling) may also be received in step S502_0 to S502_M-1, which is not shown. When a PDSCH signal and/or an SPS release PDCCH signal is present in the M DL subframes, the UE transmits ACK/NACK through a UL subframe corresponding to the M DL subframes via processes for transmitting ACK/NACK (e.g. ACK/NACK (payload) generation, ACK/NACK resource allocation, etc.) (S504). ACK/NACK includes acknowledgement information about the PDSCH signal and/or SPS release PDCCH received in step S502_0 to S502_M-1. While ACK/NACK is transmitted through a PUCCH basically, ACK/NACK is transmitted through a PUSCH when the PUSCH is transmitted at an ACK/NACK transmission time. Various PUCCH formats shown in Table 3 can be used for ACK/NACK transmission. To reduce the number of ACK/NACK bits transmitted through a PUCCH format, various methods such as ACK/NACK bundling and ACK/NACK channel selection can be used.

As described above, in TDD, ACK/NACK relating to data received in the M DL subframes is transmitted through one UL subframe (i.e. M DL SF(s): 1 UL SF) and the relationship therebetween is determined by a DASI (Downlink Association Set Index).

Table 4 shows DASI (K: $\{k_0, k_1, k_{M-1}\}$) defined in LTE(-A). Table 4 shows spacing between a UL subframe transmitting ACK/NACK and a DL subframe relating to the UL subframe. Specifically, when a PDCCH that indicates PDSCH transmission and/or SPS release is present in a subframe n-k ($k \in K$), the UE transmits ACK/NACK in a subframe n.

TABLE 4

| TDD UL-DL Configuration | Subframe n | | | | | | | | | |
| --- | --- | --- | --- | --- | --- | --- | --- | --- | --- | --- |
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |

TABLE 4-continued

| TDD UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In TDD, the UE transmits an ACK/NACK signal for at least one DL transmission signal (e.g. PDSCH) received through M DL SFs through a single UL SF. ACK/NACK for a plurality of DL SFs is transmitted through a single UL SF as follows.

1) ACK/NACK bundling: ACK/NACK bits for a plurality of data units (e.g. PDSCH, SPS release PDCCH, etc.) are combined according to a logical operation (e.g. logic-AND operation). For example, a receiving end (e.g. UE) transmits an ACK signal upon successful decoding of all data units and transmits a NACK signal or no signal upon failure of decoding (or detection) of any one of the data units.

2) Channel selection: A UE receiving a plurality of data units (e.g. PDSCH, SPS release PDCCH, etc.) occupies a plurality of PUCCH resources for ACK/NACK transmission. ACK/NACK responses to the plurality of data units are identified by combinations of PUCCH resources used for ACK/NACK transmission and transmitted ACK/NACK (e.g. bit values and QPSK symbol values). Channel selection is also referred to as ACK/NACK selection and PUCCH selection.

FIG. 6 illustrates UL ACK/NACK transmission timing when UL-DL configuration #1 is set. In the figure, SF #0 to #9 and SF #10 to #19 respectively correspond to radio frames, and numerals in blocks denote UL subframes relating to DL subframes. For example, ACK/NACK for a PDSCH of SF #5 is transmitted in SF #5+7 (=SF #12) and ACK/NACK for a PDSCH of SF #6 is transmitted in SF #6+6 (=SF #12). Accordingly, both ACKs/NACKs for DL signals of SF #5/#6 are transmitted in SF #12. Similarly, ACK/NACK for a PDSCH of SF #14 is transmitted in SF #14+4 (=SF #18).

Figure 7:
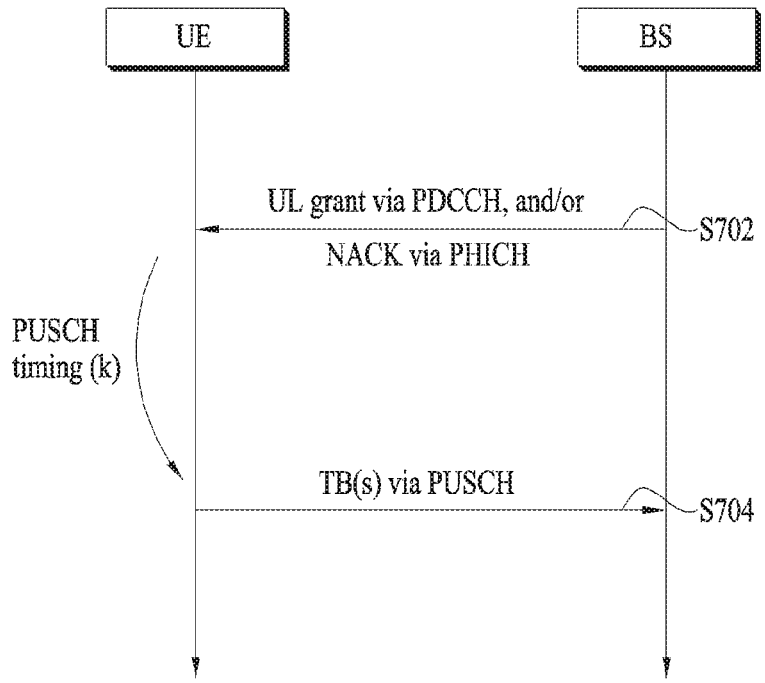
FIGS. 7 and 8 illustrate TDD PUSCH (Physical Uplink Shared Channel) transmission timing in a single cell situation.
Figure 8:
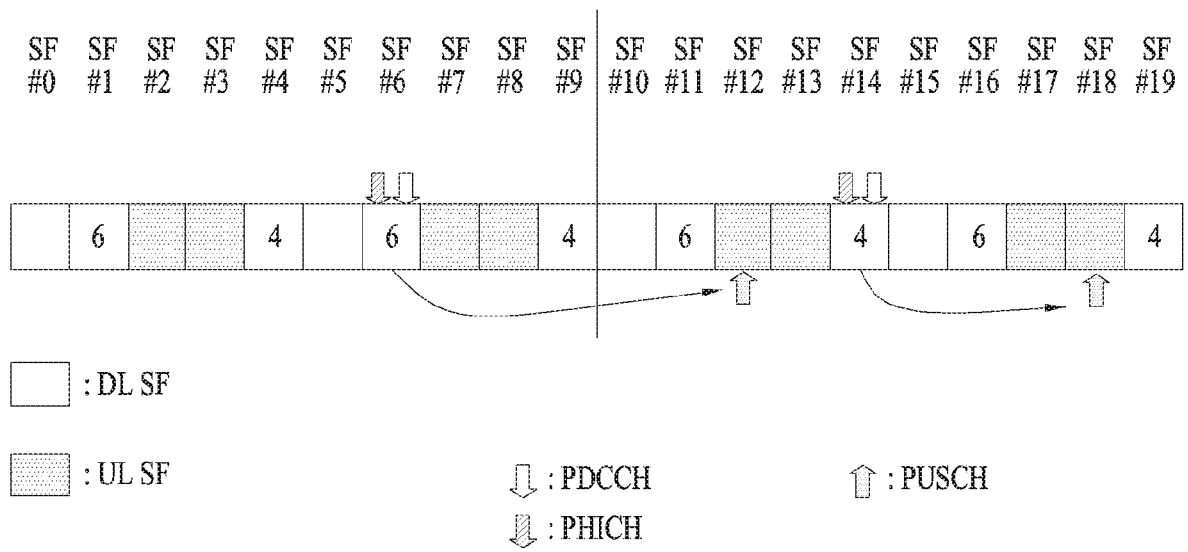

FIGS. 7 and 8 illustrate PHICH/UL grant (UG)-PUSCH timing. A PUSCH can be transmitted corresponding to a PDCCH (UL grant) and/or a PHICH (NACK).

Referring to FIG. 7, the UE can receive a PDCCH (UL grant) and/or a PHICH (NACK) through a PDCCH (S702). Here, NACK corresponds to an ACK/NACK response to previous PUSCH transmission. In this case, the UE can initially transmit/retransmit one or more TBs through a PUSCH after k subframes via processes for PUSCH transmission (e.g. TB coding, TB-CW swiping, PUSCH resource allocation, etc.) (S704). The present embodiment is based on the assumption that a normal HARQ operation in which a PUSCH is transmitted once is performed. In this case, a PHICH and a UL grant corresponding to PUSCH transmission are present in the same subframe. However, in case of subframe bundling in which a PUSCH is transmitted multiple times through a plurality of subframes, a PHICH and a UL grant corresponding to PUSCH transmission may be present in different subframes.

Table 5 shows a UAI (Unlink Association Index) (k) for PUSCH transmission in LTE(-A). Table 5 shows spacing between a DL subframe from which a PHICH/UL grant is detected and a UL subframe relating to the DL subframe. Specifically, when a PHICH/UL grant is detected from a subframe n, the UE can transmit a PUSCH in a subframe n+k.

TABLE 5

| TDD UL-DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | 4 | 4 | |
| 4 | | | | | | | | 4 | 4 | |
| 5 | | | | | | | | 4 | | |
| 6 | 7 | 7 | | | | 7 | 7 | | | 5 |

FIG. 8 illustrates PUSCH transmission timing when UL-DL configuration #1 is set. In the figure, SF #0 to #9 and SF #10 to #19 respectively correspond to radio frames, and numerals in blocks denote UL subframes relating to DL subframes. For example, a PUSCH corresponding to PHICH/UL grant of SF #6 is transmitted in SF #6+6 (=SF #12) and a PUSCH corresponding to a PHICH/UL grant of SF #14 is transmitted in SF #14+4 (=SF #18).

Figure 9:
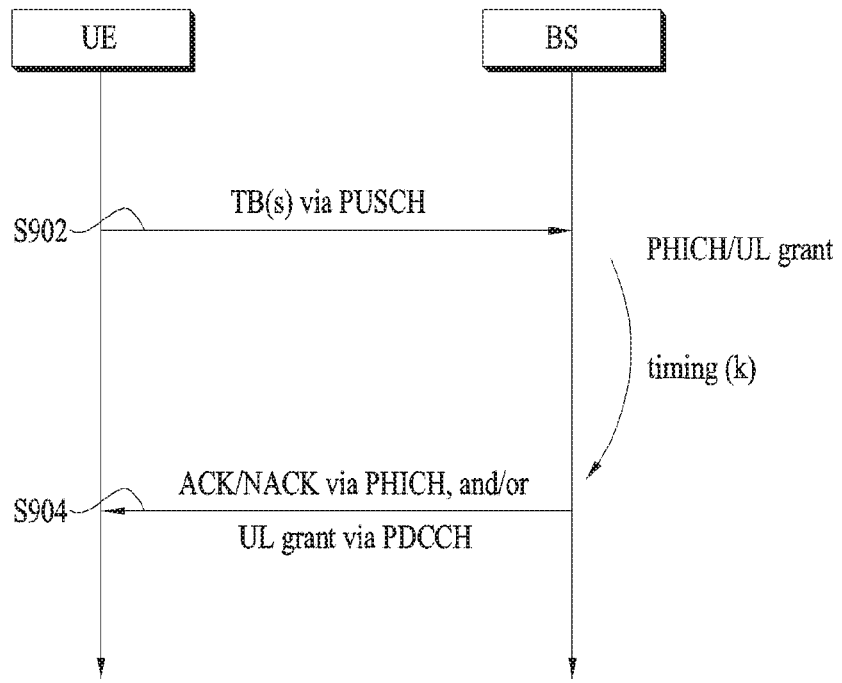
FIGS. 9 and 10 illustrate TDD DL ACK/ANCK transmission timing in a single cell situation.
Figure 10:
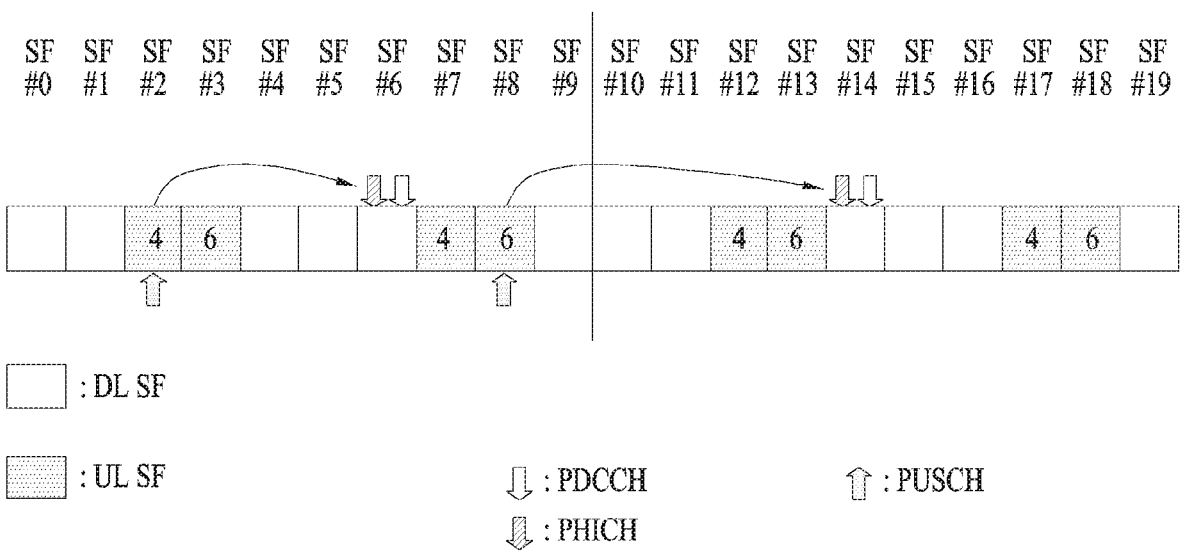

FIGS. 9 and 10 illustrate PUSCH-PHICH/UL grant timing. A PHICH is used to transmit DL ACK/NACK. Here, DL ACK/NACK means ACK/NACK transmitted on downlink as a response to UL data (e.g. PUSCH).

Referring to FIG. 9, the UE transmits a PUSCH signal to the BS (S902). Here, the PUSCH signal is used to transmit one or a plurality of (e.g. 2) TBs according to transmission mode. The BS can transmit ACK/NACK as a response to PUSCH transmission through a PHICH after k subframes via processes for ACK/NACK transmission (e.g. ACK/NACK generation, ACK/NACK resource allocation, etc.) (S904). ACK/NACK includes acknowledgement information about the PUSCH signal of step S902. When a response to PUSCH transmission is NACK, the BS can transmit a UL grant PDCCH for PUSCH retransmission to the UE after k subframes (S904). The present embodiment is based on the assumption that a normal HARQ operation in which a PUSCH is transmitted once is performed. In this case, a PHICH and UL grant used for PUSCH transmission can be transmitted in the same subframe. In case of subframe bundling, however, the PHICH and UL grant used for PUSCH transmission can be transmitted in different subframes.

Table 6 shows a UAI for PHICH/UL grant transmission in LTE(-A). Table 6 shows spacing between a DL subframe in which a PHICH/UL grant is present and a UL subframe relating to the DL subframe. Specifically, a PHICH/UL grant of a subframe i corresponds to PUSCH transmission through a subframe i-k.

TABLE 6

| TDD UL-DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | 6 | 6 | |
| 4 | | | | | | | | | 6 | 6 |

TABLE 6-continued

| TDD UL-DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 5 | | | | | | | 6 | | | |
| 6 | | 6 | 4 | | | | 7 | 4 | | 6 |

FIG. 10 illustrates PHICH/UL grant transmission timing when UL-DL configuration #1 is set. In the figure, SF # to #9 and SF #1 to #19 respectively correspond to radio frames, and numerals in blocks denote DL subframes relating to UL subframes. For example, a PHICH/UL grant corresponding to a PUSCH of SF #2 is transmitted in SF #2+4 (=SF #6) and a PHICH/UL grant corresponding to a PUSCH of SF #8 is transmitted in SF #8+6 (=SF #14).

A description will be given of PHICH resource assignment. When a PUSCH is transmitted in subframe # n, the UE determines a corresponding PHICH resource in subframe # (n+kPHICH). In FDD, kPHICH has a fixed value (e.g. 4). In TDD, $k_{PHICH}$ has a value depending on UL-DL configuration. Table 7 shows $k_{PHICH}$ values for TDD and is equivalent to Table 6.

TABLE 7

| TDD UL-DL Configuration | UL subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

A PHICH resource is provided by [HICH group index, orthogonal sequence index]. The PHICH group index and the orthogonal sequence index are determined using (i) a lowest PRB index used for PUSCH transmission and (ii) a 3-bit field value for DMRS (Demodulation Reference Signal) cyclic shift. Here, (i) and (ii) are indicated by a UL grant PDCCH.

A description will be given of a HARQ process. The UE executes a plurality of parallel HARQ processes for UL transmission. The plurality of parallel HARQ processes is used to continuously perform UL transmission while the UE waits for HARQ feedback representing whether previous UL transmission has been successful or not. Each HARQ process relates to a HARQ buffer of a MAC (Medium Access Control) layer. Each HARQ process manages the number of transmissions of a MAC PDU (Physical Data Unit) in the buffer, HARQ feedback for the MAC PDU in the buffer, and a state parameter regarding a current redundancy version (RV).

In case of LTE(-A) 1-DD, the number of UL HARQ processes for non-subframe bundling operation (i.e. normal HARQ operation) is 8. In case of LTE(-A) TDD, the number of UL HARQ processes and HARQ RTT (Round Trip Time) are set differently according to DL-UL configurations because the number of UL subframes depends on UL-DL configuration. Here, the HARQ RTT may be a time interval (in the unit of SF or ms, for example) between a time when a UL grant is received and a time when a PHICH (corresponding to the UL grant) is received through transmission of a PUSCH (corresponding the UL grant) or a time interval between a PUSCH transmission time and a PUSCH retransmission time. When subframe bundling is applied, a bundle of PUSCHs configured of 4 contiguous UL subframes is transmitted in FDD and TDD. Accordingly, a HARQ operation/process when subframe bundling is applied is different from the normal HARQ operation/process.

Table 8 shows the maximum number of DL HARQ processes according to UL-DL configuration in TDD.

TABLE 8

| TDD UL/DL configuration | Maximum number of HARQ processes |
|---|---|
| 0 | 4 |
| 1 | 7 |
| 2 | 10 |
| 3 | 9 |
| 4 | 12 |
| 5 | 15 |
| 6 | 6 |

Table 9 shows the number of synchronous UL HARQ processes and HARQ RTT in TDD. The number of UL SFs is defined per UL-DL cfg and the number of UL HARQ processes and (UL) HARQ RTT are set differently according to UL-DL configuration. HARQ RTT may refer to an interval (in unit of SF or ms) from when a UL grant is received to when a PHICH (corresponding to the UL grant) is received through transmission of a PUSCH (corresponding to the UL grant) or an interval from PUSCH transmission timing to retransmission timing corresponding thereto. When the UL HARQ RTT is 10 [SFs or ms] (UL-DL configurations #1, #2, #3, #4 and #5), one UL HARQ process uses one fixed UL SF timing. When the UL HARQ RTT does not correspond to 10 [SFs or ms] (UL-DL configurations #0 and #6), one UL HARQ process uses a plurality of UL SF timings (instead of one fixed UL SF timing) while hopping. For example, in case of UL-DL configuration #6, PUSCH transmission timings in one UL HARQ process are: SF #2: PUSCH⇒SF #13: PUSCH (RTT: 11 SFs)⇒SF #24: PUSCH (RTT: 11 SFs)⇒SF #37: PUSCH (RTT: 13 SFs)⇒SF #48: PUSCH (RTT: 11 SFs) ⇒SF #52: PUSCH (RTT: 14 SFs).

TABLE 9

| UL-DL configuration | Number of UL SFs | Number of HARQ processes for normal HARQ operation | HARQ RTT |
|---|---|---|---|
| 0 | 6 | 7 | 11 or 13 |
| 1 | 4 | 4 | 10 |
| 2 | 2 | 2 | 10 |
| 3 | 3 | 3 | 10 |
| 4 | 2 | 2 | 10 |
| 5 | 1 | 1 | 10 |
| 6 | 5 | 6 | 11 or 13 or 14 |

In case of TDD UL-DL configurations #1 to #6 and normal HARQ operation, the UE transmits a corresponding PUSCH signal in subframe n+k (refer to Table 5) according to UL grant PDCCH and/or PHICH information upon detection of the UL grant PDCCH and/or PHICH information in subframe n.

In case of TDD UL-DL configuration #0 and the normal HARQ operation, when a UL DCI grant PDCCH and/or a PHICH are detected from subframe n, PUSCH transmission timing of the UE is varied according to conditions. When the MSB (Most Significant bit) of a UL index in DCI is 1 or the PHICH is received through a resource corresponding to $I_{PHICH}=0$ in subframe #0 or #5, the UE transmits the corresponding PUSCH signal in subframe n+k (refer to Table 5). When the LSB (Least Significant bit) of the UL index in the DCI is 1, the PHICH is received through a resource corresponding to $I_{PHICH}=1$ in subframe #0 or #5, or the PHICH is received in subframe #1 or #6, UE transmits the corresponding PUSCH signal in subframe n+7. When both the MSB and LSB in the DCI are set, the UE transmits the corresponding PUSCH signal in subframe n+k (refer to Table 5) and subframe n+7.

Figure 11:
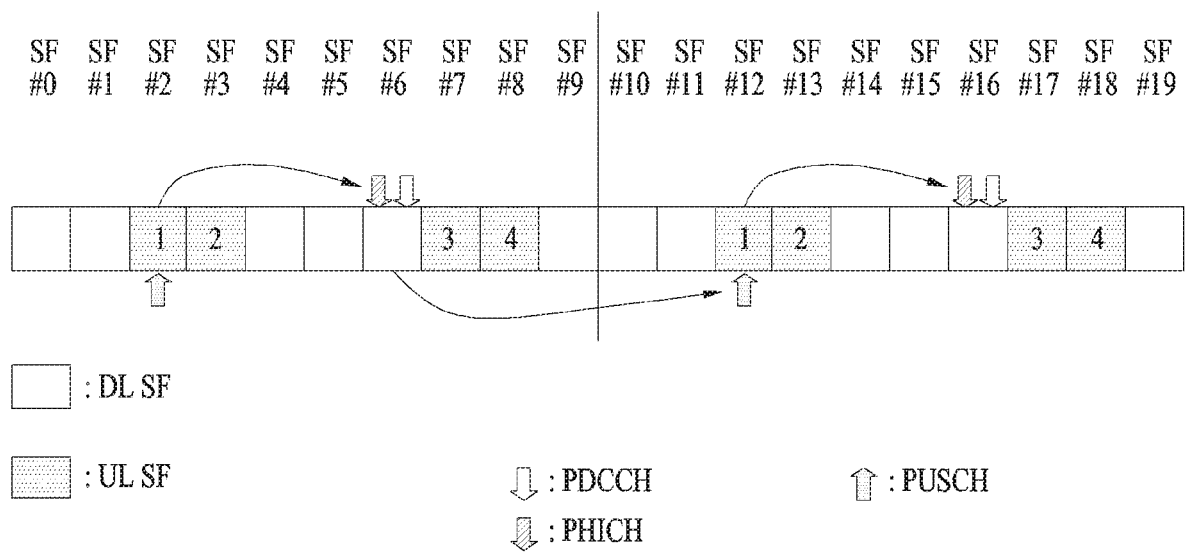
FIG. 11 illustrates a TDD HARQ (Hybrid Automatic Repeat request) process in a single cell situation.

FIG. 11 illustrates a synchronous UL HARQ process when UL-DL configuration #1 is set. Numerals in blocks denote UL HARQ process numbers. The synchronous UL HARQ process shown in FIG. 11 corresponds to a normal HARQ process. Referring to FIG. 11, HARQ process #1 involves SF #2, SF #6, SF #12 and SF #16. For example, if an initial PUSCH signal (e.g. RV=0) is transmitted in SF #2, a UL grant PDCCH and/or a PHICH corresponding to the PUSCH signal can be received in SF #6 and a (retransmission) PUSCH signal (e.g. RV=2) corresponding to the initial PUSCH signal can be transmitted in SF #12. Accordingly, 4 UL HARQ processes having an RTT (Round Trip Time) of 10 SFs (or 10 ms) are present in case of UL-DL configuration #1.

Figure 12:
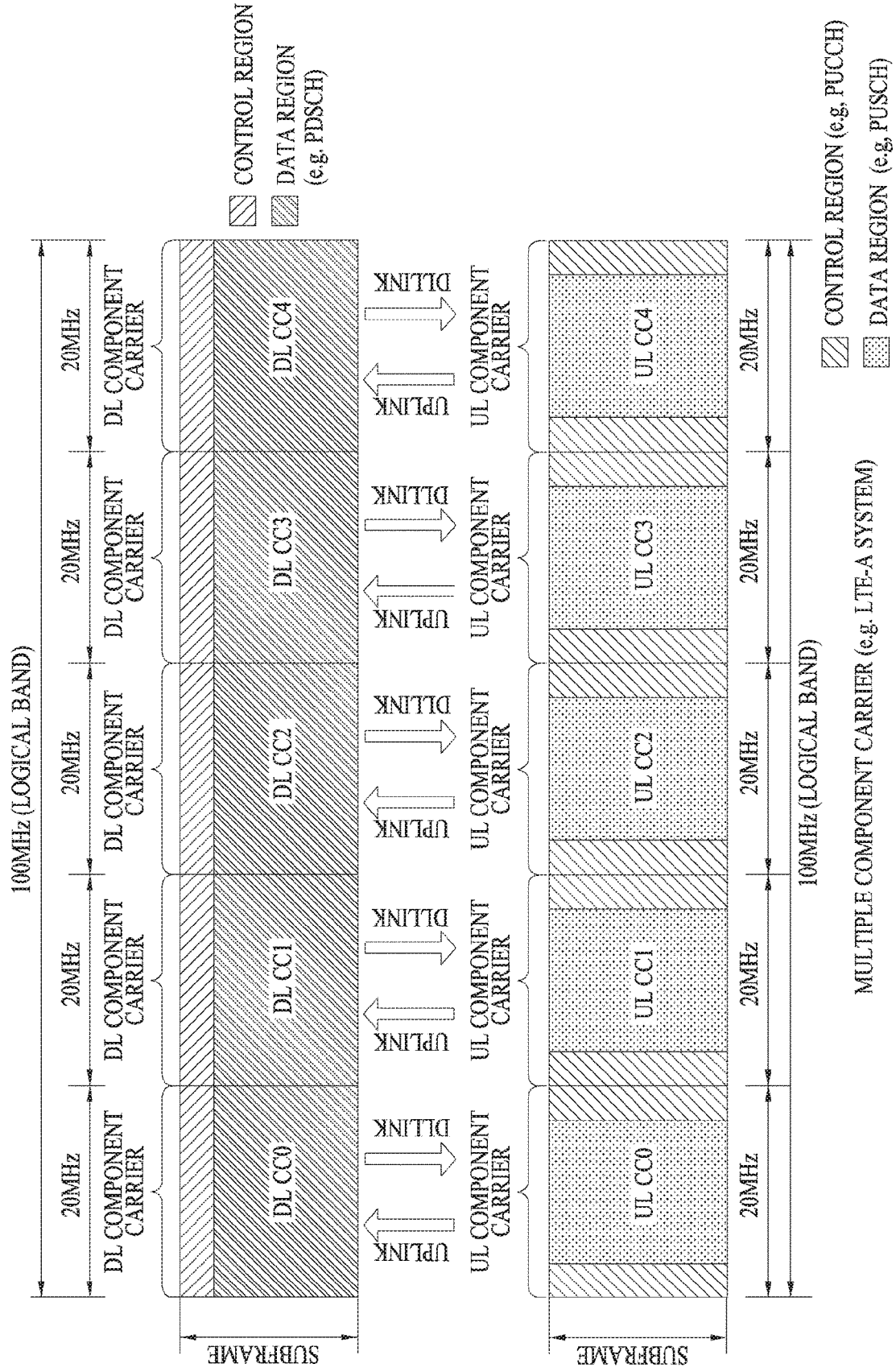
FIG. 12 illustrates a carrier aggregation (CA) communication system.

FIG. 12 illustrates a carrier aggregation (CA) communication system. To use a wider frequency band, an LTE-A system employs CA (or bandwidth aggregation) technology which aggregates a plurality of UL/DL frequency blocks to obtain a wider UL/DL bandwidth. Each frequency block is transmitted using a component carrier (CC). The CC can be regarded as a carrier frequency (or center carrier, center frequency) for the frequency block.

Referring to FIG. 12, a plurality of UL/DL CCs can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to M (<N) CCs. Various parameters with respect to CA can be set cell-specifically, UE-group-specifically, or UE-specifically. Control information may be transmitted/received only through a specific CC. This specific CC can be referred to as a Primary CC (PCC) (or anchor CC) and other CCs can be referred to as Secondary CCs (SCCs).

In LTE-A, the concept of a cell is used to manage radio resources. A cell is defined as a combination of downlink resources and uplink resources. Yet, the uplink resources are not mandatory. Therefore, a cell may be composed of downlink resources only or both downlink resources and uplink resources. The linkage between the carrier frequencies (or DL CCs) of downlink resources and the carrier frequencies (or UL CCs) of uplink resources may be indicated by system information. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell operating on a DL CC SIB2-linked to a UL CC. Furthermore, the PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_Connected state, for which CA is not set or which does not support CA. On the other hand, one or more serving cells exist, including a PCell and entire SCells, for a UE in an RRC_CONNECTED state, for which CA is set. For CA, a network may configure one or more SCells in addition to an initially configured PCell, for a UE supporting CA during connection setup after an initial security activation operation is initiated.

Figure 13:
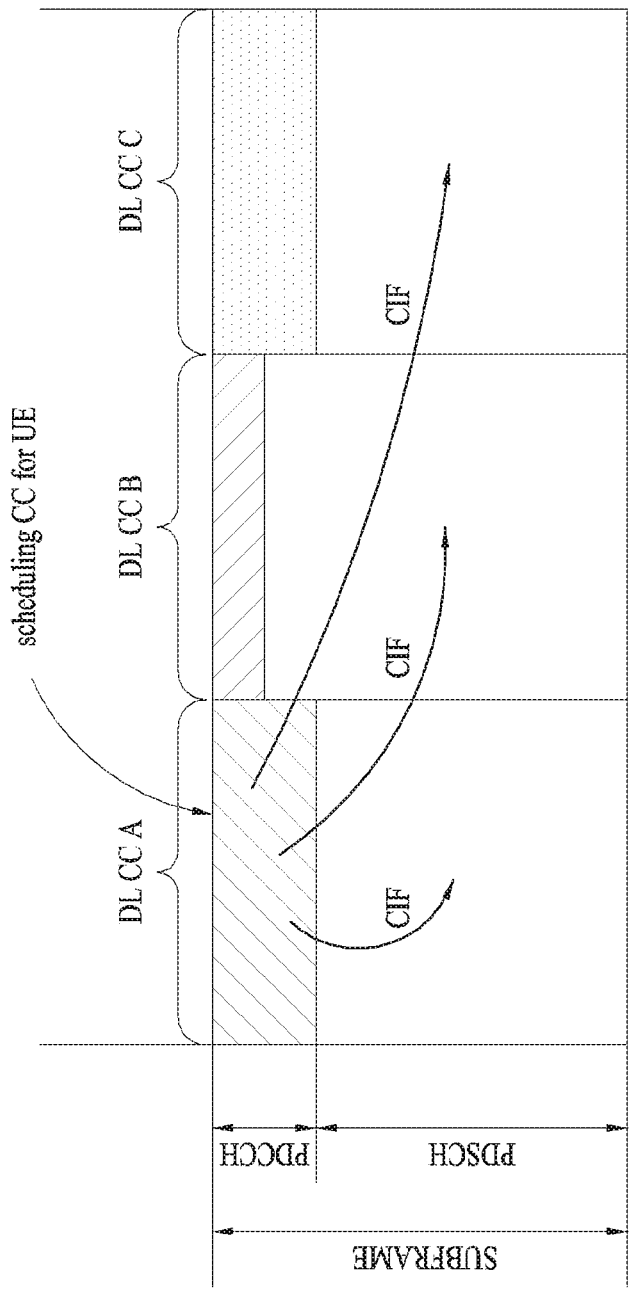
FIG. 13 illustrates scheduling when multiple carriers are aggregated.

FIG. 13 illustrates scheduling when a plurality of carriers is aggregated. It is assumed that 3 DL CCs are aggregated and DL CC A is set to a PDCCH CC. DL CC A, DL CC B and DL CC C can be called serving CCs, serving carriers, serving cells, etc. In case of CIF (Carrier Indicator Field) disabled, a DL CC can transmit only a PDCCH that schedules a PDSCH corresponding to the DL CC without a CIF (non-cross-CC scheduling). When the CIF is enabled according to UE-specific (or UE-group-specific or cell-specific) higher layer signaling, a specific CC (e.g. DL CC A) can transmit not only a PDCCH that schedules the PDSCH corresponding to the DL CC A but also PDCCHs that schedule PDSCHs of other DL CCs using the CIF (cross-CC scheduling). A PDCCH is not transmitted in DL CC B/C.

A specific CC (or cell) used for PDCCH transmission is called a scheduling CC (or scheduling cell). The scheduling CC (or cell) may be used with a monitoring CC (or MCC) interchangeably. A CC (or cell) in which a PDSCH/PUSCH is scheduled by a PDCCH of another CC is called a scheduled CC (or scheduled cell). One or more scheduling CCs may be set for one UE and one of the scheduling CCs may be used for DL control signaling and UL PUCCH transmission. That is, a scheduling CC includes a PCC. When only one scheduling CC is set, the scheduling CC corresponds to the PCC. The scheduling CC/scheduled CC may also be called MCC/SCC in the following description.

When cross-CC scheduling is set, CCs carrying signals are defined according to signal type as follows.
PDCCH (UL/DL grant): scheduling CC (or MCC)
PDSCH/PUSCH: CC indicated by a CIF of a PDCCH, detected from a scheduling CC
DL ACK/NACK (e.g. PHICH): scheduling CC (or MCC) (e.g. DL PCC)
UL ACK/NACK (e.g. PUCCH): UL PCC Embodiment: HARQ Process Based on Short TTI Low-latency based control information and data transmission can be considered as one of significant technical requirements of the next generation system after LTE-A. To this end, a time unit (e.g., transmission time unit (TTI)) for performing transmission/reception on a single DL/UL data (e.g., DL/UL-SCH transport block) may need to be smaller than an existing single SF (i.e., 1 ms). For example, for low latency based control and data transmission, TTI may need to be configured with 3 OFDMA/SC-FDMA symbols or a single slot interval. For clarity, terminologies are defined as follows.

Short TU (time unit): This indicates a time unit (i.e., TTI) for performing transmission/caption of a single DL/UL data (e.g., transport block). For low latency transmission, a short TU is set smaller than TTI (i.e., 1 SF=1 ms) of an existing system (e.g., LTE/LTE-A). For example, a short TU can be configured as N (e.g., 3) OFDMA/SC-FDMA symbols or a single slot interval (where, 0<N<7). For clarity, a TTI of an existing system is named a normal TTI and a short TU is named a short TTI.

Short DL: This indicates a DL interval configured with a single short TU.

Short UL: This indicates a UL interval configured with a single short TU.

Short TI: This indicates a (minimum) time interval/latency between control information and data [refer to FIGS. 6 to 11]. For example, a short TI can indicate: (i) a (minimum) time interval/latency between a DL data Rx timing through short DL and an HARQ-ACK Tx timing through short UL [cf. FIG. 6]; (ii) a (minimum) time interval/latency between a UL grant Rx timing through short DL and a UL data Tx timing through short UL [cf. FIG. 8]; (iii) a (minimum) time interval/latency between a UL data Tx timing through short UL and an HARQ-ACK Rx timing through short DL [cf. FIG. 10]; and (iv) a (minimum) time interval/latency between an HARQ-ACK Tx timing through short UL and a data retransmission timing through short DL [cf. FIG. 6]. Namely, short TI may mean a time interval between short DL/UL and short UL/DL. For clarity, a time interval from short DL to short UL and a time interval from short UL to short DL are defined as short GD (grant to data) and short DH (data to HARQ-ACK), respectively. The short GD corresponds to (i) and (ii) and the short DH corresponds to (iii) and (iv).

Meanwhile, in an existing TDD system (e.g., LTE/LTE-A), it is able to designate an SF pattern configuring a single radio frame based on UL-DL configuration broadcasted through SIB (system information block) [cf. Table 1]. SF configuration may have a DL-to-UL switching period of 5 or 10 ms according to UL-DL configuration. If a minimum time interval between PUSCH transmission and PUSCH retransmission corresponding thereto is defined as min-RTT (minimum round trip time) in aspect of UL HARQ operation, an existing TDD system generally has a structure of performing HARQ operation based on min-RTT of 10 ms except a specific UL-DL configuration (e.g., 0 or 6) [cf. Table 9].

In order to configure short TU in an existing TDD system, there is a method of simply inserting short DL and short UL in DL SF and UL SF, respectively. Yet, according to this method, since short DL/UL is configured in a manner of depending on a UL-DL configuration based SF structure only, it may be difficult to support (secure and maintain) short TI between control information and data (i.e., between short DL/UL and short UL/DL) due to a section in which a plurality of the same (DL or UL) SFs are contiguous. For one example, in case of TDD UL-DL configuration #1, SF configuration is set to [D S U U D D S U U D] by radio frame unit. If the above method is applied, since each of DL SF and UL SF is contiguous twice at least, it may be difficult to secure short TI (e.g., short GD or short DH) smaller than 2 ms (e.g., short TI of 1 ms). For another example, in case of TDD UL-DL configuration #3, SF configuration is set to [D S U U U D D D D D] by radio frame unit. If the above method is applied, since each of DL SF and UL SF is contiguous three times at least, it may be difficult to secure short TI (e.g., short GD or short DH) smaller than 2 ms (e.g., short TI of 1 ms). Here, D, S and U mean DL SF, S (special) SF and UL SF, respectively [cf. Table 1].

In the following, the present invention proposes an HARQ operating method based on short TU configuration for low latency based control and data transmission in a TDD system. In the present invention, [ms] and [SF] may have the same meaning (e.g., time interval/unit, etc.). For example, 1 SF can have a length of 1 ms. Moreover, for clarity, DL ACK/NACK and UL ACK/NACK are named PHICH and HARQ-ACK, respectively. PUSCH corresponding to a UL grant may mean/include PUSCH corresponding to a PHICH/UL grant. And, a DL grant (PDSCH) corresponding to HARQ-ACK may mean/include a DL grant (PDSCH retransmission).

(1) Method 1: Min-RTT and Short GD/Short DH Configuration

In case of an existing TDD system having an SF of 1 ms as a basic TTI unit, the system generally operates min-RTT of 10 ms [cf. Table 9]. On the other hand, considering latency reduction for control/data transmission, DL-to-UL switching period of minimum 5 ms and the like, it is able to consider a method of setting min-RTT to 5 ms in short DL/UL based TDD. Dl-to-UL switching is performed in S SF and a DL-to-UL switching period is equal to (SF) period of S SF [cf. Table 1]. In UL-DL configuration #0~#2/#6, a period of S SF is 5 ms or 5 SF. In UL-DL configuration #3~#5, a period of S SF is 10 ms or 10 SF. Hence, a minimum period of DL-to-UL switching (or, a minimum (SF) period of S SF) is 5 ms or 5 SF.

For example, an (earliest) retransmission timing for PUSCH transmitted through short UL in SF # n can be set to short UL in SF # (n+5). And, an (earliest) PHICH and/or retransmission UL grant Tx timing for PUSCH corresponding to UL grant of short DL in SF # n can be set to short DL in SF # (n+5). Namely, it is able to set 'short GD+short DH=minimum DL-to-UL switching period (i.e., 5 ms). Here, the minimum DL-to-UL switching period indicates a shortest period among DL-to-UL switching periods of UL-DL configurations #0~#6.

To this end, if K short ULs (having (short TU) indexes 0 to K-1 in order of time) are configured in SF # n, an (earliest) retransmission timing for PUSCH transmitted through short UL having a specific index in SF # n can be set to short UL having the same index in SF # (n+5). Moreover, if K short DLs (having (short TU) indexes 0 to K-1 in order of time) are configured in SF # n, an (earliest) PHICH and/or retransmission timing for PUSCH corresponding to UL grant of short DL having a specific index in SF # n can be set to short DL having the same index in SF # (n+5).

For the 5 ms min-RTT based HARQ operation, lengths of short GD and short DH can be set differently by considering the following items under the condition of 'short GD+short DH=5 ms'.

Case #1) Latency/complexity in a UE, required for decoding of DL/UL grant (and PDSCH) and encoding of HARQ-ACK/PUSCH corresponding thereto Case #2) Latency, etc. in a BS, required for a corresponding data scheduling through short DL/UL from a DL/UL data generation timing For example, (short GD, shot DH) can be set to (3 ms, 2 ms) or (4 ms, 1 ms). Considering Case #2, (short GD, short DH) can be set to (2 ms, 3 ms) or (1 ms, 4 ms). If (short GD, short DH) is expressed as (X ms, Y ms), an HARQ-ACK/PUSCH Tx timing corresponding to DL grant(PDSCH)/UL grant of short DL in SF # n can be set to short UL in SF # (n+X). Here, short DL of SF # n and short UL of SF # (n+X) can have the same (short TU) index. Moreover, an (earliest) PHICH and/or retransmission UL grant Tx timing for PUSCH of short UL in SF # n can be set to short DL in SF # (n+Y). Here, short UL of SF # n and short DL of SF # (n+Y) can have the same (short TU) index.

Figure 14:
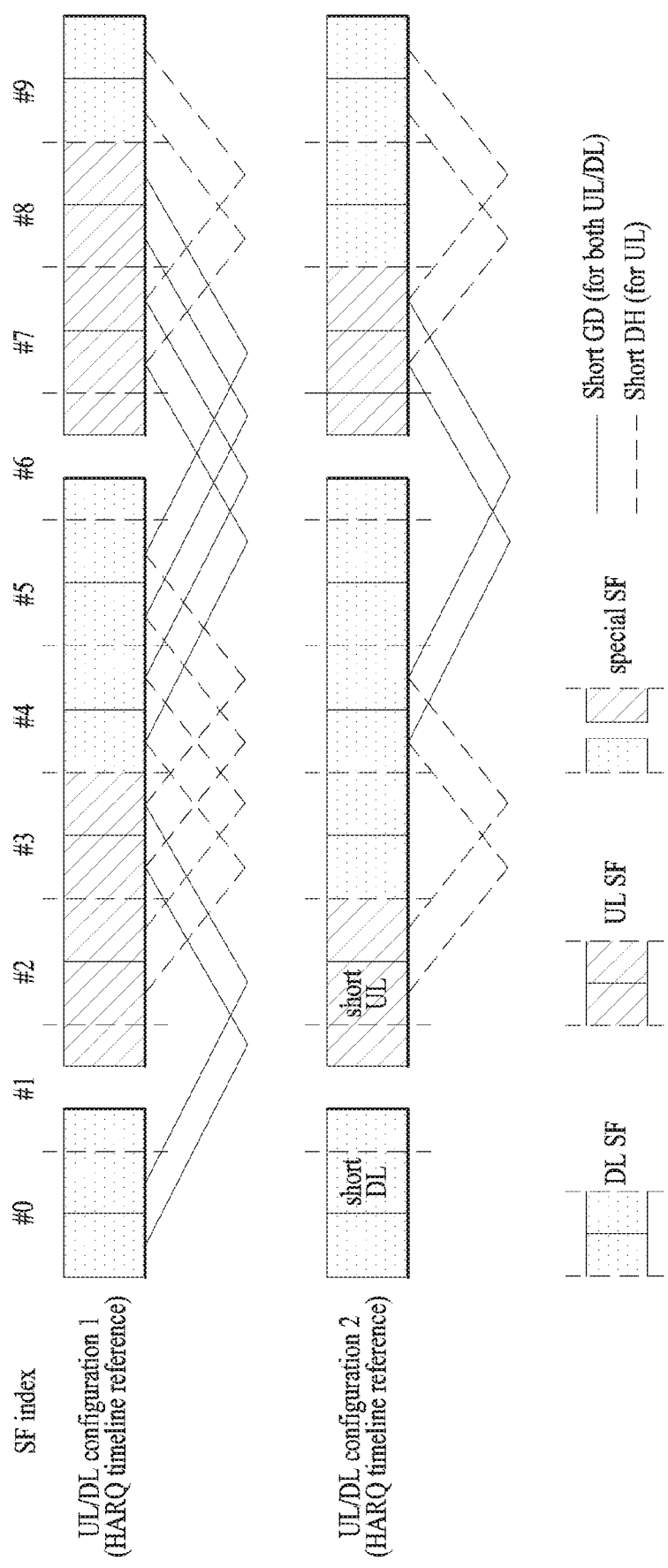
FIGS. 14 to 18 exemplarily show an HARQ process according to the present invention.

By applying the principle of the present method, it is able to consider a method of setting a short DL/UL based reference HARQ timeline on the basis of UL-DL configurations #1 and #2 having DL-to-UL switching period of 5 ms. FIG. 14 exemplarily shows a short DL/UL based reference HARQ timeline on the basis of UL-DL configurations #1 and #2. FIG. 14 assumes that maximum 2 short TUs can be configured within a single SF and that a length of each short TU is set equal to or smaller than a single slot interval (e.g., 0.5 ms). In this case, min-RTT can be given as 5 ms based on a DL-to-UL switching period and (short GD, short DH) can be set to (3 ms, 2 ms). Hence, an HARQ-ACK Tx timing corresponding to DL grant (PDSCH) of short DL in SF # n (e.g., SF #0) is set to short UL in SF # n+3 and a PDSCH retransmission timing can be set to short DL in SF # n+5.

Meanwhile, SF #1/SF #6 in UL-DL configuration #1 cannot set an HARQ timeline having 'short GD+short DH=5 ms' of the proposed type (e.g., short GD and short DH have integer values). In UL-DL configuration #2, SF #0/SF #1/SF #3/SF #5/SF #6/SF #8 cannot set an HARQ timeline having 'short GD+short DH=5 ms' the proposed type (e.g., short GD and short DH have integer values). A method of setting HARQ timelines of them is described in the following.

With reference to HARQ timelines of UL-DL configurations #1 과 #2, HARQ timelines applied to the rest of UL-DL configurations (e.g., UL-DL configuration #0/#3/#4/#5/#6) can be set up. A method of setting HARQ timelines of them is described in the following.

(2) Method 2: Processing Special SF and DL Heavy Case

In case of configuring short TU in TDD situation, configuring short DL/UL in special SF as well may be effective in aspect of latency reduction. Particularly, short DL may be set as a section including DwPTS region entirely or in part and short UL may be set as a section including UpPTS region entirely or in part. Moreover, short DL or short UL may be set in form of including Gap section (i.e., GP) entirely or in part. For clarity, short DL and short UL configured in special SF are defined as short sDL and short sUL.

Short GD and short DH for an HARQ operation based on short sDL/sUL configured in special SF can be set different from values set for short DL/UL in the general DL/UL SF proposed in Method 1. Basically, if it is possible to apply short GD/short DH set for short DL/UL in general DL/UL SF to short sDL/sUL, short GD/short DH set for short DL/UL in general DL/UL SF can be applied to short sDL/sUL as it is. If it is impossible, short GD and short DH for short GD/short DH set for short DL/UL in general DL/UL SF to short sDL/sUL can be set different from Method 1. For example, when short TU (or SF) exists ahead of short sUL and an interval of the short TU with short sUL is short GD (cf. Method 1), if the short TU is short DL (or DL SF), Method 1 is applicable as it is. When an interval of short TU (or SF) with short sUL is short GD (cf. Method 1), if the short TU (or SF) is short UL (or UL SF), short GD for short sUL can be set different from Method 1. For clarity, shot GD/short DH applied to short DL/UL in DL/UL SF is named short nGD/short nDH (cf. Method 1), and short GD and short DH applied to short sDL/sUL is named short sGD/short sDH.

For example, if short GD/short DH (i.e., short nGD/short nDH) of Method 1 is not applicable as it is, short GD/short DH (i.e., short sGD/short sDH) for short sUL can be set as follows.

Step #1) short DL having a maximum value of an interval with short sUL among short DL(s) having an interval with the short sUL smaller than short nGD by existing ahead of the short sUL can be set to a DL grant (PDSCH)/UL grant Tx timing corresponding to HARQ-ACK/PUSCH in the short sUL.

Step #2) short DL having an interval with short DL correspond to 5 ms of min-RTT by existing behind the short DL of Step #1 can be set to: (i) a PHICH/UL grant Tx timing corresponding to PUSCH in the short sUL; (ii) a DL grant (PDSCH retransmission) Tx timing corresponding to HARQ-ACK in the corresponding short sUL; or (iii) a PDSCH retransmission timing corresponding to PDSCH of the short DL of Step #1.

Similarly, if it is unable to apply short GD/short DH (i.e., short nGD/short nDH) of Method 1 at it is, short GD/short DH (i.e., short nGD/short nDH) for short sDL can be set as follows.

Step #1) short UL having a maximum value of an interval with short sDL among short UL(s) having an interval with the short sDL smaller than short nGD by existing behind the short sDL can be set to an HARQ-ACK/PUSCH Tx timing corresponding to a DL grant (PDSCH)/UL grant in the short sDL.

Step #2) short UL having an interval with short UL correspond to 5 ms of min-RTT by existing ahead of the short UL of Step #1 can be set to: (i) a PUSCH Tx timing corresponding to PHICH/UL grant in the short sDL; (ii) an HARQ-ACK Tx timing corresponding to DL grant (PDSCH retransmission) in the corresponding short sDL; or (iii) a PUSCH (re)Tx timing corresponding to PUSCH of the short UL of Step #1.

Meanwhile, due to an unequal DL/UL SF ratio of UL-DL configuration (particularly, a DL heavy ratio in which DL SFs are more than UL SFs), there may exist short DLs in DL SF, to which Method-1 based short GD (i.e., short nGD) is not applicable intactly. For such short DL, (by existing behind the short DL), Case #1) if there exists short UL of which interval with the short DL is smaller than short nGD, short UL having a maximum value of an interval with the short DL among short UL(s) of which interval with the short DL is smaller than short nGD can be set to an HARQ-ACK Tx timing corresponding to DL grant (PDSCH) in the short DL, or Case #2) if there does not exist short UL of which interval with the short DL is smaller than short nGD, short UL having a minimum value of an interval with the short DL (among short UL(s) of which interval with the short DL is greater than short nGD) can be set to an HARQ-ACK Tx timing corresponding to DL grant (PDSCH) in the short DL. Here, short UL includes short sUL.

Similarly, due to an unequal DL/UL SF ratio of UL-DL configuration (particularly, a UL heavy), there may exist short ULs in UL SF, to which Method-1 based short GD and short DH are not applicable intactly. For such short UL, (by existing ahead of the short UL), Case #1) if there exists short DL of which interval with the short UL is smaller than short nGD, short DL having a maximum value of an interval with the short UL among short DL(s) of which interval with the short UL is smaller than short nGD can be set to a UL grant (PHICH) Tx timing corresponding to PUSCH in the short UL, or Case #2) if there does not exist short DL of which interval with the short UL is smaller than short nGD, short DL having a minimum value of an interval with the short UL (among short DL(s) of which interval with the short UL is greater than short nGD) can be set to a UL grant (PHICH) Tx timing corresponding to PUSCH in the short UL. Here, short DL includes short sDL.

Figure 15:
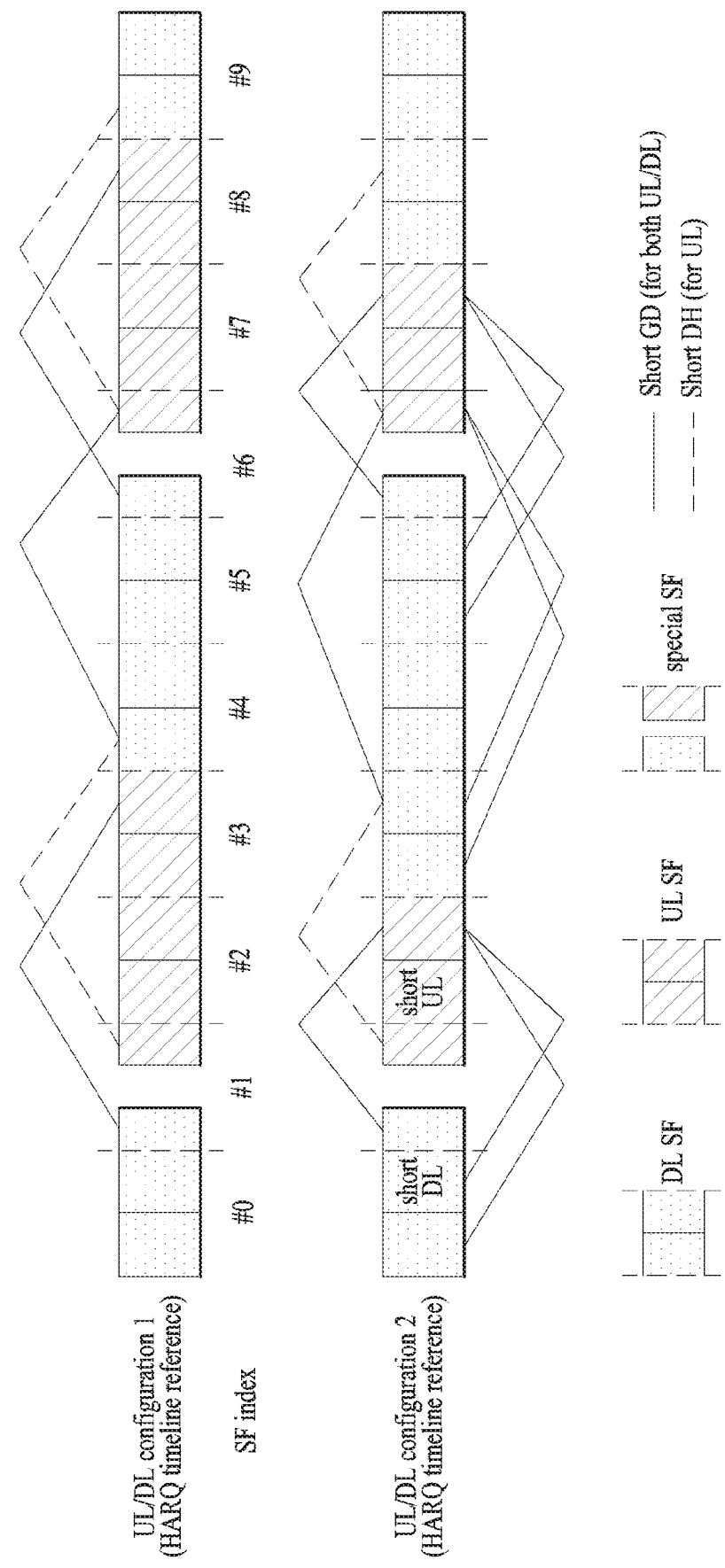

By applying the principle of the present method, it is able to consider a method of configuring a short DL/UL based reference HARQ timeline on the basis of UL-DL configurations #1 and #2 having DL-to-UL switching period of 5 ms. FIG. 15 exemplarily shows a short DL/UL based reference HARQ timeline on the basis of UL-DL configurations #1 and #2. FIG. 15 assumes that maximum 2 short TUs can be configured within a single SF and that a length of each short TU is set equal to or smaller than a single slot interval (e.g., 0.5 ms). For the rest of short DL/UL except short DL/UL in which Method-1 based HARQ timeline is configured in FIG. 14, in case of (short nGD, short nDH)=(3 ms, 2 ms), an HARQ timeline can be configured based on Method 2 like FIG. 15. In particular, an HARQ timeline (i.e., short GD/DH) for SF #1/SF #6 in UL-DL configuration #1 can be configured as shown in the drawing. Moreover, an HARQ timeline (i.e., short GD/DH) for SF #0/SF #1/SF #3/SF #5/SF #6/SF #8 in UL-DL configuration #2 can be configured as shown in the drawing.

Figure 16:
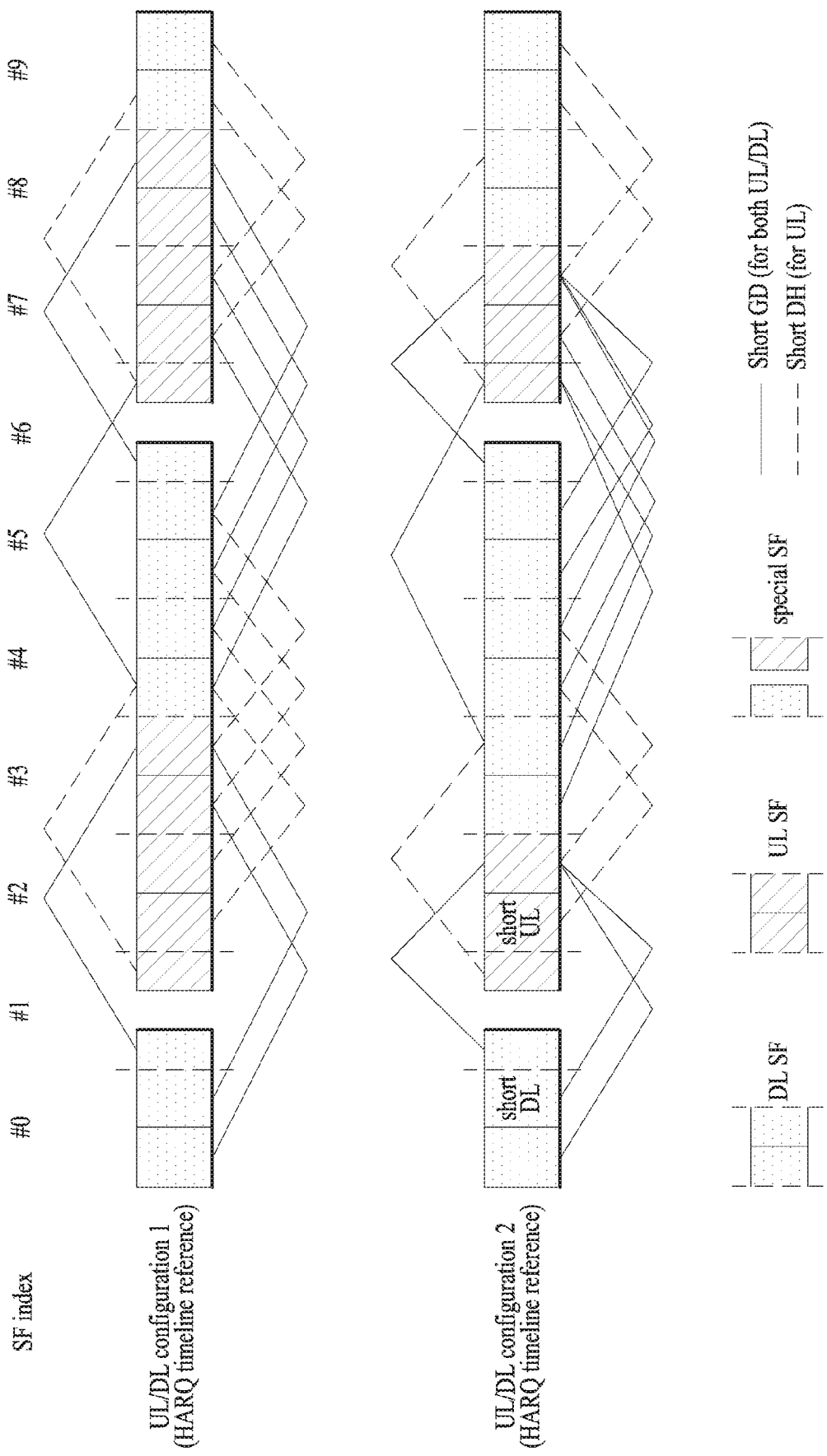

FIG. 16 shows one example of final HARQ timelines configured in short DL/UL in UL-DL configurations #1 and #2 in case of applying both Method 1 and Method 2. FIG. 16 shows a combination of FIG. 14 and FIG. 15.

(3) Method 3: Short DL/UL Configuration on UL/DL SF

Although a DL PDSCH relevant HARQ timeline can be configured for DL-heavy UL-DL configuration (or, UL-DL configuration in which multiple DL SFs are adjacent to each other) based on Method 2, the scheduling/HARQ latency relevant to UL PUSCH may increase due to the still DL-heavy SF configuration. Considering this, it is able to consider a method of selecting some specific DL SF from all DL SFs and then configuring short UL on the specific DL SF. Moreover, short DL may be configured on the specific DL SF according to the UL-DL configuration property. And, it is possible to configure both short DL and short UL under circumstances (e.g., disposing short UL behind short DL). The specific DL SF may include SF set as MBSFN (Multicast Broadcast Single Frequency Network) SF. Namely, in a state that DL SF (not real but fake) is set as MBSFN SF, short UL and/or short UL can be configured in the corresponding DF SF. An MBSFN set is configured by upper layer signaling (e.g., RRC signaling), and the MBSFN set is repeated by unit of 40 ms. A general UE ignores MBSFN SF, and a UE supportive of short TTI can perform signal Tx/Rx operation on the assumption that short TU is configured in MBSFN SF.

Moreover, in a manner similar to the above description, although a UL PDSCH relevant HARQ timeline can be configured for UL-heavy UL-DL configuration (or, UL-DL configuration in which multiple UL SFs are adjacent to each other) based on Method 2, the scheduling/HARQ latency relevant to DL PDSCH may increase due to the still UL-heavy SF configuration. Considering this, it is able to consider a method of selecting some specific UL SF from all UL SFs and then configuring short DL on the specific UL SF. And, it is possible to configure both short DL and short UL on the specific UL SF according to UL-DL configuration property and situation (e.g., disposing short UL behind short DL, or disposing short DL behind short UL).

Meanwhile, by identically applying the principle of Method 1/2 to short UL (and/or short DL) configured on specific DL SF and short DL (and/or short UL) configured on specific UL SF (with reference to specific UL-DL configuration or HARQ time like, it is able to configure an HARQ timeline.

Figure 17:
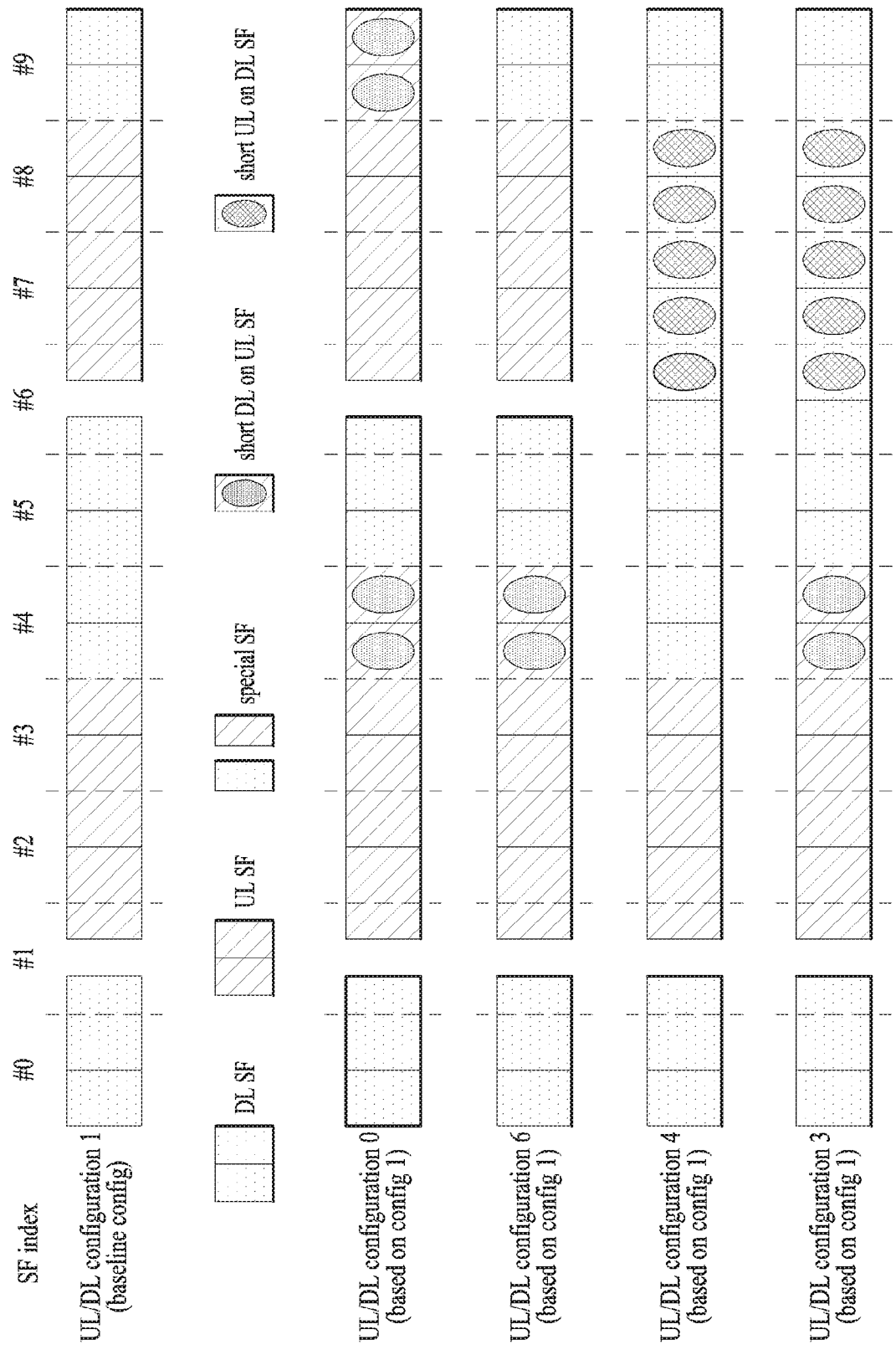
Figure 18:
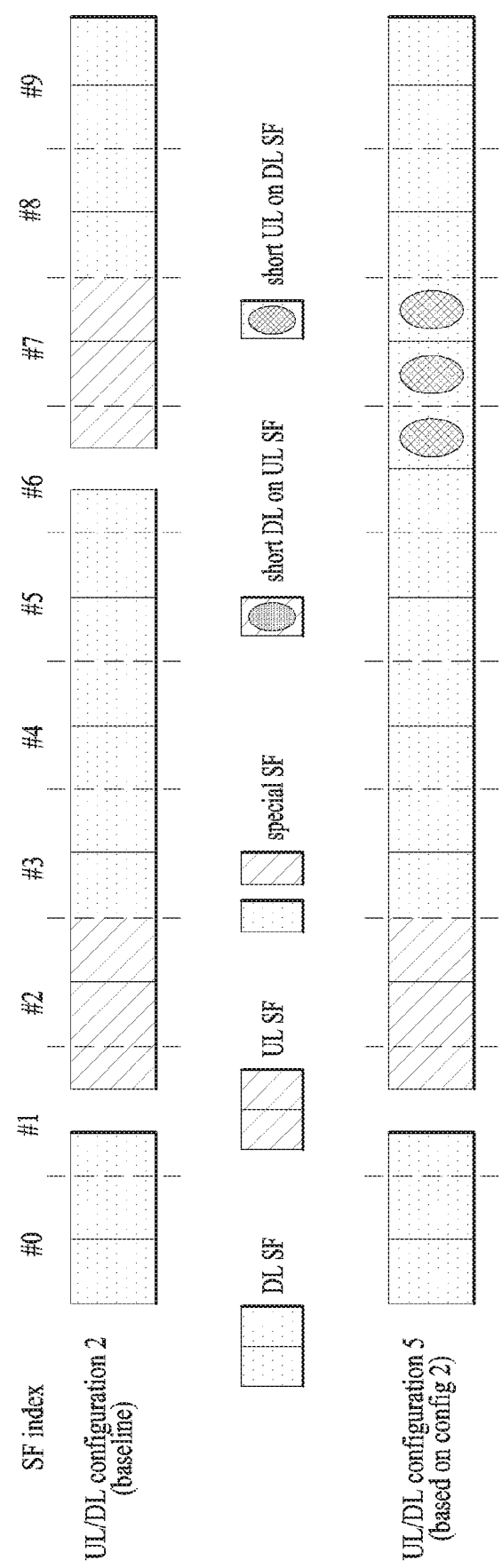

FIG. 17 shows an example of applying Method 3 to UL-DL configuration #0/6/4/3 with reference to HARQ timeline configured in UL-DL configuration #1 (based on Method 1/2 and FIG. 16). Through this, the HARQ timeline configured in UL-DL configuration #1 can be identically applied to UL-DL configuration #0/6/4/3. FIG. 18 shows an example of applying Method 3 to UL-DL configuration #5 with reference to HARQ timeline configured in UL-DL configuration #2 (based on Method 1/2 and FIG. 16). Through this, the HARQ timeline configured in UL-DL configuration #2 can be identically applied to UL-DL configuration #5.

Additionally, based on a random method including the proposal of the present invention (and a random duplexing scheme including TDD or frame structure), in a state that a linked SF corresponding to short DL (in a specific SF) is defined/configured in advance (e.g., semi-static), it is able to consider a scheme of dynamically indicating whether a specific one of a plurality of short ULs in the linked SF is a short UL actually corresponding to the short DL. For example, it is able to consider a scheme of indicating a short UL index in a linked SF, in which HARQ-ACK transmission for PDSCH corresponding to DL grant DCI will be performed, through the DL grant DCI transmitted in short DL (within a specific SF) or a short UL index in a linked SF, in which PUSCH transmission corresponding to DL grant DCI will be performed, through UL grant DCI transmitted in short DL.

Meanwhile, it is able to consider a method of linking a plurality of short DLs (or short ULs) in a single SF to a single short UL (or short DL) (in a linked SF). For example, a UL grant for scheduling PUSCH transmission in short UL can be transmitted from any one of a plurality of short DLs in a specific SF (e.g., a linked SF). Hence, a UE can attempt UL grant detection/decoding in all of a plurality of linked short DLs. PHICH corresponding to PUSCH transmission in a plurality of short ULs in a specific SF can be transmitted through a single short DL (within a linked SF). Hence, there may be a single PHISCH resource/index corresponding to a plurality of PUSCHs. Moreover, similarly, it is able to consider a method of linking a single short DL (or short UL) (within a specific SF) to a plurality of short ULs (or short DLs) within a single (linked) SF. For example, a UL grant transmitted through a specific short DL can schedule PUSCH transmission in all, some or one of a plurality of short ULs within a single (linked) SF. To this end, the short UL number/index for performing PUSCH transmission can be indicated from a UL grant. PHICH corresponding to PUSCH transmission in a specific short UL can be transmitted from one of a plurality of short DLs within a single (linked) SF. To this end, a short DL index for performing PHICH transmission can be indicated from a UL grant.

The proposed method of the present invention is non-limited to a TDD system but can be generally extended and applied to a case of configuring/setting short DL/UL on DL/UL SF in a system situation of using a random duplexing scheme or a random frame structure. For example, it is able to consider a scheme of configuring an HARQ timeline relevant to DL PDSCH/UL PUSCH corresponding to short DL on DL carrier and/or short UL on UL carrier.

Figure 19:
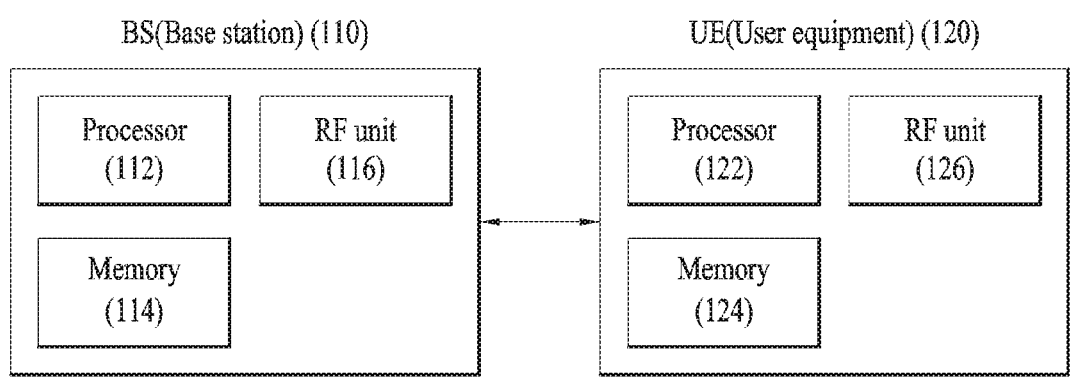
FIG. 19 illustrates a BS and a UE applicable to an embodiment of the present invention.

FIG. 19 illustrates a BS and a UE to which the present invention is applicable. When a wireless communication system includes a relay, backhaul link communication is performed between the BS and the relay and access link communication is carried out between the relay and the UE. Accordingly, the BS or UE illustrated in FIG. 20 can be replaced by the relay.

Referring to FIG. 10, the wireless communication system includes the BS 110 and the UE 120. The BS 110 may include a processor 112, a memory 114 and a radio frequency (RF) unit 116. The processor 112 may be configured to implement procedures and/or methods proposed by the present invention. The memory 114 may be connected to the processor 112 and store information related to operations of the processor 112. The RF unit 116 may be connected to the processor 112 and transmit and/or receive RF signals. The UE 120 may include a processor 122, a memory 124 and an RF unit 126. The processor 122 may be configured to implement procedures and/or methods proposed by the present invention. The memory 124 may be connected to the processor 122 and store information related to operations of the processor 122. The RF unit 126 may be connected to the processor 122 and transmit and/or receive RF signals. The BS 110 and/or the UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

A specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term, fixed station, Node B, eNode B (eNB), access point, etc. The term terminal may be replaced with the terms UE, MS, Mobile Subscriber Station (MSS), etc.

The embodiments of the present invention may be achieved by various means, for example, hardware, firmware, software, or a combination thereof. In a hardware configuration, an embodiment of the present invention may be achieved by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention can be used for radio communication apparatuses such as a UE, a relay, an eNB, etc.

What is claimed is:

1. A method of performing a Hybrid Automatic Repeat request (HARD) procedure by a communication device in a wireless communication system, comprising:
   receiving information indicating UL-DL (uplink-downlink) configuration,
   wherein a subframe (SF) pattern according to the UL-DL configuration is represented as Table 1, and a DL-SF and an UL SF are configured with a plurality of short-Transmission Time Intervals (TTIs);
   transmitting/receiving HARQ-acknowledgement (ACK) information in a short-TTI of SF # n for data received/transmitted in a short-TTI of SF # n-a;
   re-receiving/retransmitting the data in a short-TTI of SF # n+b,
   wherein a+b is equal to the SF number corresponding to a minimum DL-to-UL switching period,

TABLE 1

| Uplink-downlink | Subframe number | | | | | | | | | |
|---|---|---|---|---|---|---|---|---|---|---|
| configuration | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D, | where D, S and U indicate DL SF, special (S) SF and UL SF, respectively,
wherein the S SF comprises at least one UL short-TTI;
transmitting HARD-ACK information in a UL short-TTI of S SF # m for data received in a short-TTI of SF # m-c; and
re-receiving the data in a short-TTI of SF # m+d,
wherein if SF # m−a is DL SF, c has a value equal to a,
wherein if the SF # m−a is UL SF, the SF # m−c is a DL SF having a biggest interval with the S SF # m among at least one DL SF of which interval with S SF # m is smaller than a SFs, and
wherein c+d is equal to a+b.

2. The method of claim 1, wherein a+b is equal to a minimum SF period of S SF.

3. The method of claim 1, wherein the UL-DL configuration comprises either UL-DL configuration #1 or UL-DL configuration #2 and wherein a+b is 5.

4. A communication device configured to perform a Hybrid Automatic Repeat request (HARD) procedure in a wireless communication system, comprising:
   a radio frequency (RF) unit; and
   a processor configured to receive information indicating UL-DL (uplink-downlink) configuration,
   wherein a subframe (SF) pattern according to the UL-DL configuration is represented as Table 1, and a DL-SF and an UL SF are configured with a plurality of short-Transmission Time Intervals (TTIs), wherein the processor is further configured to transmit/
receive HARQ-acknowledgement (ACK) information
in a short-TTI of SF # n for data received/transmitted
in a short-TTI of SF # n−a and re-receive/retransmit the
data in a short-TTI of SF # n+b, wherein a+b is equal to the SF number corresponding to
a minimum DL-to-UL switching period,

TABLE 1

| Uplink-downlink | Subframe number | | | | | | | | |
|---|---|---|---|---|---|---|---|---|---|
| configuration | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D, | where D, S and U indicate DL SF, special (S) SF and UL SF, respectively, wherein the S SF comprises at least one UL short-TTI, wherein the processor is further configured to transmit HARQ-ACK information in a UL short-TTI of S SF # m for data received in a short-TTI of SF # m−c and re-receive the data in a short-TTI of SF # m+d, wherein if SF # m−a is DL SF, c has a value equal to a, wherein if the SF # m−a is UL SF, the SF # m−c is a DL SF having a biggest interval with the S SF # m among at least one DL SF of which interval with S SF # m is smaller than a SFs, and wherein c+d is equal to a+b.

5. The communication device of claim 4, wherein a+b is equal to a minimum SF period of S SF.

6. The communication device of claim 4, wherein the UL-DL configuration comprises either UL-DL configuration #1 or UL-DL configuration #2 and wherein a+b is 5.

* * * * *